(12) United States Patent  
Davis et al.

(10) Patent No.: US 9,348,985 B2  
(45) Date of Patent: *May 24, 2016

(54) BEHAVIORAL FINGERPRINT CONTROLLED AUTOMATIC TASK DETERMINATION

(75) Inventors: Marc E. Davis, San Francisco, CA (US); Matthew G. Dyor, Bellevue, WA (US); Daniel A. Gerrity, Seattle, WA (US); Xuedong Huang, Bellevue, WA (US); Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Nathan P. Myhrvold, Bellevue, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/373,684

(22) Filed: Nov. 23, 2011

(65) Prior Publication Data

US 2013/0133033 A1    May 23, 2013

(51) Int. Cl.  
*G06F 21/31* (2013.01)

(52) U.S. Cl.  
CPC .................................. *G06F 21/316* (2013.01)

(58) Field of Classification Search  
CPC ..... G06F 21/316; G06F 15/16; G06F 21/305; H04L 63/08; H04L 63/0823; H04L 63/102  
USPC ............................................................. 726/3  
See application file for complete search history.

(56) References Cited

U.S. PATENT DOCUMENTS

| 6,084,953 | A | 7/2000 | Bardenheuer et al. |
|---|---|---|---|
| 6,829,596 | B1 | 12/2004 | Frazee |
| 6,957,199 | B1 | 10/2005 | Fisher |
| 7,305,360 | B1 | 12/2007 | Lamoureux et al. |
| 7,433,960 | B1 | 10/2008 | Dube et al. |
| 7,533,155 | B2 | 5/2009 | Kitada |
| 7,577,987 | B2 | 8/2009 | Mizrah |
| 7,689,418 | B2 | 3/2010 | Ramaswamy et al. |
| 7,794,769 | B2 | 9/2010 | Cox et al. |
| 7,827,592 | B2 | 11/2010 | Fifer et al. |
| 7,908,237 | B2 | 3/2011 | Angell et al. |

(Continued)

FOREIGN PATENT DOCUMENTS

WO    WO 2011/119273 A3    9/2011

OTHER PUBLICATIONS

Brainard, John; Juels, Ari; Rivest, Ronald L.; Szydlo, Michael; Yung, Moti; "Fourth-Factor Authentication: Somebody You Know"; ACM CCS; 2006; pp. 168-178; Alexandria, Virginia.

(Continued)

*Primary Examiner* — Harunur Rashid

(57) ABSTRACT

A computationally implemented method includes, but is not limited to: determining a behavioral fingerprint associated with a network-accessible user, the behavioral fingerprint providing a current status of the network-accessible user; and controlling one or more devices automatically as a function of the determined behavioral fingerprint and a direction received from the network-accessible user. In addition to the foregoing, other method aspects are described in the claims, drawings, and text forming a part of the present disclosure.

36 Claims, 19 Drawing Sheets

(56) References Cited

U.S. PATENT DOCUMENTS

| | | |
|---|---|---|
| 7,929,733 B1 | 4/2011 | Lehnert et al. |
| 7,975,150 B1 | 7/2011 | Lillibridge et al. |
| 8,020,005 B2 | 9/2011 | Mani et al. |
| 8,051,468 B2 | 11/2011 | Davis et al. |
| 8,078,515 B2 | 12/2011 | John |
| 8,155,999 B2 | 4/2012 | de Boer et al. |
| 8,160,943 B2 | 4/2012 | Smith et al. |
| 8,161,530 B2 | 4/2012 | Meehan et al. |
| 8,169,916 B1 | 5/2012 | Pai et al. |
| 8,175,959 B2 | 5/2012 | Mylet et al. |
| 8,185,646 B2 | 5/2012 | Headley |
| 8,285,639 B2 | 10/2012 | Eden et al. |
| 8,290,908 B2 | 10/2012 | McCarthy et al. |
| 8,316,237 B1 | 11/2012 | Felsher et al. |
| 8,358,579 B1 | 1/2013 | Walsh et al. |
| 8,364,713 B2 | 1/2013 | Pollard |
| 8,388,446 B1 | 3/2013 | Craine et al. |
| 8,392,969 B1 | 3/2013 | Park et al. |
| 8,522,147 B2 | 8/2013 | Bladel et al. |
| 8,533,266 B2 | 9/2013 | Koulomzin et al. |
| 8,582,829 B2 | 11/2013 | Shuster |
| 8,726,036 B2 | 5/2014 | Kornafeld et al. |
| 8,732,089 B1 | 5/2014 | Fang et al. |
| 8,776,168 B1* | 7/2014 | Gibson et al. ............... 726/1 |
| 8,806,598 B2 | 8/2014 | Assam |
| 8,819,789 B2 | 8/2014 | Orttung et al. |
| 8,892,461 B2 | 11/2014 | Lau et al. |
| 2002/0046105 A1 | 4/2002 | Gardenswartz et al. |
| 2002/0073046 A1 | 6/2002 | David |
| 2003/0220980 A1 | 11/2003 | Crane |
| 2004/0002329 A1 | 1/2004 | Bhatia et al. |
| 2004/0193892 A1* | 9/2004 | Tamura et al. ............... 713/182 |
| 2005/0071643 A1 | 3/2005 | Moghe |
| 2005/0100198 A1 | 5/2005 | Nakano et al. |
| 2005/0171832 A1 | 8/2005 | Hull et al. |
| 2005/0268107 A1 | 12/2005 | Harris et al. |
| 2006/0020814 A1 | 1/2006 | Lieblich et al. |
| 2006/0020816 A1 | 1/2006 | Campbell |
| 2006/0020876 A1* | 1/2006 | Chang ............... H03M 13/3961 714/795 |
| 2006/0074769 A1 | 4/2006 | Looney et al. |
| 2006/0133651 A1 | 6/2006 | Polcha et al. |
| 2006/0161553 A1 | 7/2006 | Woo |
| 2006/0218153 A1 | 9/2006 | Voon et al. |
| 2006/0224898 A1 | 10/2006 | Ahmed |
| 2007/0067853 A1* | 3/2007 | Ramsey ............... 726/28 |
| 2007/0218900 A1 | 9/2007 | Abhyanker |
| 2007/0240203 A1 | 10/2007 | Beck |
| 2007/0245157 A1* | 10/2007 | Giobbi et al. ............... 713/186 |
| 2007/0245158 A1 | 10/2007 | Giobbi et al. |
| 2007/0250550 A1* | 10/2007 | Berninger ............... 707/203 |
| 2008/0091453 A1 | 4/2008 | Meehan et al. |
| 2008/0092209 A1 | 4/2008 | Davis et al. |
| 2008/0098456 A1 | 4/2008 | Alward et al. |
| 2008/0138472 A1 | 6/2008 | Alexandre |
| 2008/0146193 A1 | 6/2008 | Bentley et al. |
| 2008/0167002 A1* | 7/2008 | Kim ............... H04W 12/12 455/411 |
| 2008/0172461 A1 | 7/2008 | Thattai et al. |
| 2008/0235614 A1 | 9/2008 | Ricklefs et al. |
| 2008/0281668 A1 | 11/2008 | Nurminen |
| 2009/0006846 A1* | 1/2009 | Rosenblatt ............... 713/159 |
| 2009/0025081 A1 | 1/2009 | Quigley et al. |
| 2009/0030985 A1 | 1/2009 | Yuan |
| 2009/0070435 A1 | 3/2009 | Abhyanker |
| 2009/0093235 A1* | 4/2009 | Grealish ............... G06F 21/88 455/411 |
| 2009/0111491 A1* | 4/2009 | Lemberg ............... H04M 1/72533 455/466 |
| 2009/0113040 A1* | 4/2009 | Zalewski ............... 709/224 |
| 2009/0169062 A1 | 7/2009 | Cheung et al. |
| 2009/0210494 A1 | 8/2009 | Fisher et al. |
| 2009/0220653 A1 | 9/2009 | Doucet |
| 2009/0228509 A1 | 9/2009 | McCarthy et al. |
| 2009/0292010 A1 | 11/2009 | Shigemura et al. |
| 2009/0298514 A1 | 12/2009 | Ullah |
| 2010/0073202 A1 | 3/2010 | Mazed |
| 2010/0088157 A1 | 4/2010 | Wilson |
| 2010/0115592 A1 | 5/2010 | Belz et al. |
| 2010/0115610 A1* | 5/2010 | Tredoux et al. ............... 726/19 |
| 2010/0130165 A1 | 5/2010 | Snyder et al. |
| 2010/0161544 A1 | 6/2010 | Song et al. |
| 2010/0169343 A1 | 7/2010 | Kenedy et al. |
| 2010/0174709 A1 | 7/2010 | Hansen et al. |
| 2010/0179856 A1 | 7/2010 | Paretti et al. |
| 2010/0179857 A1 | 7/2010 | Kalaboukis et al. |
| 2010/0186066 A1 | 7/2010 | Pollard |
| 2010/0241964 A1 | 9/2010 | Belinsky et al. |
| 2010/0250676 A1 | 9/2010 | Ufford et al. |
| 2010/0255172 A1 | 10/2010 | Maningat et al. |
| 2010/0274815 A1 | 10/2010 | Vanasco |
| 2010/0293094 A1 | 11/2010 | Kolkowitz et al. |
| 2010/0299292 A1* | 11/2010 | Collazo ............... 706/14 |
| 2010/0299757 A1 | 11/2010 | Lee |
| 2010/0306099 A1 | 12/2010 | Hirson et al. |
| 2010/0319053 A1 | 12/2010 | Gharabally |
| 2010/0323730 A1 | 12/2010 | Karmarkar |
| 2011/0016534 A1* | 1/2011 | Jakobsson et al. ............... 726/28 |
| 2011/0029887 A1 | 2/2011 | Pearson et al. |
| 2011/0070898 A1* | 3/2011 | Sanjeev ............... H04W 4/028 455/456.2 |
| 2011/0072487 A1 | 3/2011 | Hadar et al. |
| 2011/0112898 A1 | 5/2011 | White |
| 2011/0131122 A1 | 6/2011 | Griffin et al. |
| 2011/0137789 A1 | 6/2011 | Kortina et al. |
| 2011/0145927 A1* | 6/2011 | Hubner et al. ............... 726/26 |
| 2011/0161085 A1 | 6/2011 | Boda et al. |
| 2011/0162034 A1 | 6/2011 | Nagaratnam et al. |
| 2011/0185401 A1 | 7/2011 | Bak et al. |
| 2011/0191200 A1 | 8/2011 | Bayer et al. |
| 2011/0196926 A1 | 8/2011 | Crawford |
| 2011/0209196 A1 | 8/2011 | Kennedy |
| 2011/0225048 A1 | 9/2011 | Nair |
| 2011/0231223 A1 | 9/2011 | Winters |
| 2011/0238482 A1 | 9/2011 | Carney et al. |
| 2011/0239276 A1 | 9/2011 | Garcia Garcia et al. |
| 2011/0251823 A1 | 10/2011 | Davis et al. |
| 2011/0276486 A1 | 11/2011 | Kuba |
| 2011/0302640 A1* | 12/2011 | Liu et al. ............... 726/6 |
| 2011/0314017 A1 | 12/2011 | Yariv et al. |
| 2011/0314559 A1 | 12/2011 | Jakobsson |
| 2011/0321157 A1 | 12/2011 | Davis et al. |
| 2012/0030764 A1* | 2/2012 | White et al. ............... 726/23 |
| 2012/0041822 A1 | 2/2012 | Landry et al. |
| 2012/0100869 A1 | 4/2012 | Liang et al. |
| 2012/0131034 A1 | 5/2012 | Kenedy et al. |
| 2012/0136936 A1 | 5/2012 | Quintuna |
| 2012/0137340 A1 | 5/2012 | Jakobsson et al. |
| 2012/0144468 A1 | 6/2012 | Pratt et al. |
| 2012/0159647 A1 | 6/2012 | Sanin et al. |
| 2012/0198491 A1 | 8/2012 | O'Connell et al. |
| 2012/0198532 A1 | 8/2012 | Headley |
| 2012/0226701 A1 | 9/2012 | Singh |
| 2012/0284602 A1 | 11/2012 | Seed et al. |
| 2012/0284779 A1* | 11/2012 | Ingrassia et al. ............... 726/5 |
| 2012/0323685 A1 | 12/2012 | Ullah |
| 2013/0013404 A1 | 1/2013 | Suprock et al. |
| 2013/0019289 A1 | 1/2013 | Gonser et al. |
| 2013/0024916 A1 | 1/2013 | Evans |
| 2013/0036458 A1 | 2/2013 | Liberman et al. |
| 2013/0036459 A1 | 2/2013 | Liberman et al. |
| 2013/0042327 A1 | 2/2013 | Chow |
| 2013/0054433 A1 | 2/2013 | Giard et al. |
| 2013/0054470 A1 | 2/2013 | Campos et al. |
| 2013/0055367 A1 | 2/2013 | Kshirsagar et al. |
| 2013/0061285 A1 | 3/2013 | Donfried et al. |
| 2013/0067546 A1 | 3/2013 | Thavasi et al. |
| 2013/0091262 A1 | 4/2013 | Rajakarunanayake et al. |
| 2013/0096980 A1* | 4/2013 | Basavapatna et al. ............... 705/7.28 |
| 2013/0097673 A1 | 4/2013 | Meehan et al. |
| 2013/0097683 A1 | 4/2013 | Davis et al. |
| 2013/0102283 A1 | 4/2013 | Lau et al. |
| 2013/0133052 A1 | 5/2013 | Davis et al. |
| 2013/0133054 A1 | 5/2013 | Davis et al. |

(56) References Cited

U.S. PATENT DOCUMENTS

| | | | |
|---|---|---|---|
| 2013/0159413 | A1 | 6/2013 | Davis et al. |
| 2013/0167207 | A1 | 6/2013 | Davis et al. |
| 2013/0198811 | A1 | 8/2013 | Yu et al. |
| 2013/0227700 | A1 | 8/2013 | Dhillon et al. |
| 2013/0291099 | A1 | 10/2013 | Donfried |
| 2013/0305325 | A1 | 11/2013 | Headley |
| 2013/0305336 | A1 | 11/2013 | Konertz et al. |
| 2014/0158760 | A1 | 6/2014 | Seker |

OTHER PUBLICATIONS

Diep, Francie; "Your finger swipe could become your password"; NBC News Future Tech; Oct. 2, 2012; http://www.nbcnews.com/technology/futureoftech/your-finger-swipe-could-become-your-password-6215845.

Gianchandani, Erwin; "DARPA Seeking to Develop a 'Cognitive Fingerprint'"; Computing Community Consortium Blog; Jan. 27, 2012; http://www.cccblog.org/2012/01/27/darpa-seeking-to-develop-a-cognitive-fingerprint/.

Jacobs, Tom; "Identity Protection That Really Clicks"; Pacific Standard Magazine; May 3, 2012; http://www.psmag.com/business-economics/identity-protection-that-really-clicks-42048/.

Jorgensen, Zach; Yu, Ting; "On Mouse Dynamics as a Behavioral Biometric for Authentication"; 2011; pp. 476-482; Department of Computer Science, North Carolina State University; Releigh, North Carolina.

Riva, Oriana; Qin, Chuan; Strauss, Karin; Lymberopoulos, Dimitrios; "Progressive authentication: deciding when to authenticate on mobile phones"; Microsoft Research; Aug. 8, 2012; http://research.microsoft.com/apps/pubs/default/aspx?id=168102.

Trejo et al.; "Using Cloud Computing MapReduce operations to Detect DDoS Attacks on DNS servers"; Proceedings of the 4$^{th}$ Iberian Grid Infrastructure Conference; pdf created Mar. 1, 2013; pp. 1-13.

Xie et al.; "Privacy-Preserving Matchmaking for Mobile Social Networking Secure Against Malicious Users"; 2011 Ninth Annual International Conference on Privacy, Security and Trust; bearing a date of Jul. 11, 2011; pp. 1-8; IEEE.

U.S. Appl. No. 13/373,682, Davis et al.

Germanakos et al.; "Personalization Systems and Processes Review based on a Predetermined User Interface Categorization"; Proceedings of the III International conference on communication and reality, digital utopia in the media: From discourses to facts; May 2005; 12 pages.

Mobasher et al.; "Creatinig Adaptive Web Sites Through Usage-Based Clustering of URLs"; IEEE; 1999 (created on May 9, 2014); 7 pages.

Monrose et al.; "Keystroke dynamics as a biometric for authentication"; Future Generation Computer Systems; Mar. 3, 1999; pp. 351-359; vol. 16; ©2000 Elsevier Science B.V.

Nauman et al.; "TOKEN: Trustable Keystroke-Based Authentication for Web-Based Applications on Smartphones"; ISA 2010, CCIS 76; 2010 (created on May 9, 2014); pp. 286-297; © Springer-Verlarp Berlin Heidelberg 2010.

PCT International Search Report; International App. No. PCT/US13/48664; Dec. 3, 2013; pp. 1-3.

Venkataram et al.; "An authentication scheme for ubiquitous commerce: A cognitive agents based approach"; Network Operations and Management Symposium Workshops; Apr. 7-11, 2008; pp. 248-256; IEEE.

\* cited by examiner

102/102a Level of Authentication Module

- 210 Behavioral Fingerprint Interaction Module
  - 212 Anomalous Action Detecting Module
  - 216 Social Network Confirmation Module

- 218 Statistical Level Determination Module

- 220 Visual Cue Detecting Module
  - 222 Face Detecting Module

- 226 Audio Cue Detecting Module
  - 227 Voice Pattern Detecting Module

- 230 Geographic Location Determination Module/ GPS

FIG. 2b

BEHAVIORAL FINGERPRINT CONTROLLED AUTOMATIC TASK DETERMINATION

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:
(1) the present application claims benefit of priority of U.S. Provisional Patent Application No. 61/632,836, entitled "Behavioral Fingerprint Based Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, Clarence T. Tegreene, as inventors, filed Sep. 24, 2011, which was filed within the twelve months preceding the filing date of the present application, or is an application of which a currently co-pending application is entitled to the benefit of the filing date;
(2) the present application claims benefit of priority of U.S. Provisional Patent Application No. 61/572,309, entitled "Network-Acquired Behavioral Fingerprint for Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, Clarence T. Tegreene, as inventors, filed Oct. 13, 2011, which was filed within the twelve months preceding the filing date of the present application, or is an application of which a currently co-pending application is entitled to the benefit of the filing date;
(3) the present application constitutes a continuation-in-part of U.S. patent application Ser. No. 13/373,685, entitled "Behavioral Fingerprint Device Identification", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, Clarence T. Tegreene, as inventors, filed concurrently herewith on Nov. 23, 2011, which is currently co-pending, or is an application of which a currently co-pending application is entitled to the benefit of the filing date;
(4) the present application constitutes a continuation-in-part of U.S. patent application Ser. No. 13/373,680, entitled "Behavioral Fingerprint Controlled Theft Detection and Recovery", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, Clarence T. Tegreene, as inventors, filed concurrently herewith on Nov. 23, 2011, which is currently co-pending, or is an application of which a currently co-pending application is entitled to the benefit of the filing date;
(5) the present application constitutes a continuation-in-part of U.S. patent application Ser. No. 13/373,677, entitled "Trust Verification Schema Based Transaction Authorization", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, Clarence T. Tegreene, as inventors, filed concurrently herewith on Nov. 23, 2011, which is currently co-pending, or is an application of which a currently co-pending application is entitled to the benefit of the filing date; and
(6) the present application constitutes a continuation-in-part of U.S. patent application Ser. No. 13/373,682, entitled "Social Network Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, Clarence T. Tegreene, as inventors, filed concurrently herewith on Nov. 23, 2011, which is currently co-pending, or is an application of which a currently co-pending application is entitled to the benefit of the filing date.

The United States Patent Office (USPTO) has published a notice to the effect that the USPTO's computer programs require that patent applicants both reference a serial number and indicate whether an application is a continuation or continuation-in-part. Stephen G. Kunin, *Benefit of Prior-Filed Application*, USPTO Official Gazette Mar. 18, 2003, available at www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

FIELD OF INVENTION

This invention relates generally to the field of authentication and behavioral fingerprint automatic task determination.

SUMMARY

A computationally implemented method includes, but is not limited to determining a behavioral fingerprint associated with a network-accessible user, the behavioral fingerprint providing a current status of the network-accessible user; and controlling one or more devices automatically as a function of the determined behavioral fingerprint and a direction received from the network-accessible user. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware in one or more machines or article of manufacture configured to effect the herein-referenced method aspects depending upon the design choices of the system designer.

A computationally implemented system includes, but is not limited to: means for determining a behavioral fingerprint associated with a network-accessible user, the behavioral fingerprint providing a current status of the network-accessible user; and means for controlling one or more devices automatically as a function of the determined behavioral fingerprint and a direction received from the network-accessible user. In addition to the foregoing, other system aspects are described in the claims, drawings, and text forming a part of the present disclosure.

A computationally implemented system includes, but is not limited to: one or more instructions for determining a behavioral fingerprint associated with a network-accessible user, the behavioral fingerprint providing a current status of the network-accessible user; and one or more instructions for controlling one or more devices automatically as a function of the determined behavioral fingerprint and a direction received from the network-accessible user. In addition to the foregoing, other system aspects are described in the claims, drawings, and text forming a part of the present disclosure.

A computer program product comprising an article of manufacture bearing one or more instructions for determining a behavioral fingerprint associated with a network-accessible user, the behavioral fingerprint providing a current status of the network-accessible user; and one or more instructions for controlling one or more devices automatically as a function of the determined behavioral fingerprint and a direction received from the network-accessible user. In addition to the foregoing, other computer program product aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2b shows another perspective of the level of authentication module 102.

FIG. 3b shows another perspective of the behavioral fingerprint module 106/106a.

DETAILED DESCRIPTION

Figure 1:
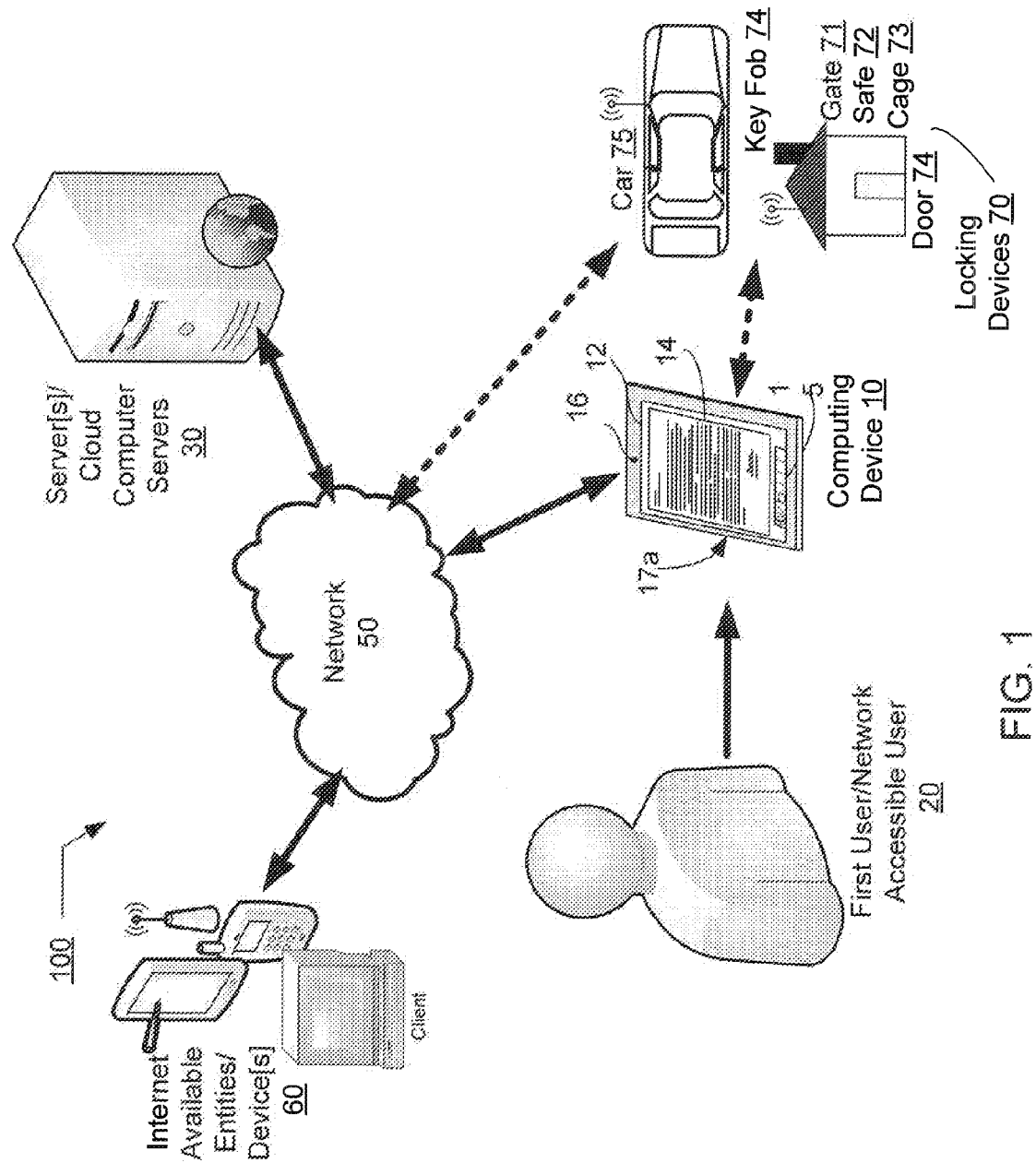
FIG. 1 shows a computer server 30 and a computing device 10 in an exemplary environment 100.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) resulted in the development of computing devices with tremendous processing power and relatively small form factors. Examples of such computing devices include, for example, laptops, Netbooks, tablet computers (i.e., "slate" computers), e-readers, smartphones, and so forth. Having a small form factor with tremendous processing power presents numerous opportunities for developing applications that previously required desktop computers or other stationary devices. One problem with the numerous applications available on a small form factor is that authentication becomes paramount. For example, if an application enables a mobile phone or a smartphone or a computing device, such as a key fob to open doors to a home, it is important to determine that the user of the device/phone/fob is the true owner.

Embodiments herein are directed to enabling authentication and verification to be determined based on a behavioral fingerprint of the true owner of a device.

In accordance with various embodiments, computationally implemented methods, systems, and articles of manufacture are provided that can determine a level of authentication of a first user of a computing device; and in response to determining the level of authentication, automatically enable one or more actions as a function of the level of authentication. In various embodiments, such computationally implemented methods, systems, and articles of manufacture may be implemented at the computing device and/or a computer server networked to a computing device.

Referring now to FIG. 1, the figure illustrates a computing device 10 connected via a network interface to a computer server 30 in an exemplary environment 100. Computing device 10 is shown being operated by a first user 20. As will be further described herein the illustrated computing device 10 and computer server 30 may employ the computationally implemented methods, systems, and articles of manufacture in accordance with various embodiments. The computing device 10 and computer server 30, in various embodiments, may be endowed with logic that is designed to determine a level of authentication of a user of the computing device 10, and in response to such a determination, automatically enable functions of the computing device 10.

First user 20 may be the primary user, such as the owner, of the computing device 10, or could be a person given authority to use the computing device by the owner. As discussed below, the level of authentication associated with the first user 20, whether owner or not, is determined, at least partially based on a behavioral fingerprint of the owner of computing device 10. More particularly, a level of authentication associated with first user 20 of computing device 10 can be determined based on a behavioral fingerprint of the owner of computing device 10. The behavioral fingerprint of an owner of computing device 10 can be configured to be network accessible by computing device 10 via network 50 to server[s] 30. Server[s] 30 can be a cloud of connected network servers or can be a web server or the like. The behavioral fingerprint of an owner/authorized user of computing device 10 can be configured to override or be a determining factor for a level of authentication associated with computing device 10.

Although the computing device 10 illustrated in FIG. 1 is depicted as being a tablet computer, in alternative embodiments, the computationally implemented methods, systems, and articles of manufacture in accordance with various embodiments may be embodied in other types of computer systems having other form factors including other types of portable computing devices such as, for example, mobile telephones, laptops, Netbooks, smartphones, e-readers, and so forth. For example, device[s] 60 illustrate smartphones, client computers and the like as possible computing devices. As illustrated, the computing device 10 can include a display 12, such as a touchscreen, on the front side 17a of the computing device 10. Computing device 10 can further include a keyboard, either as a touch input/output keyboard or as an attached keyboard. As further depicted in FIG. 1, the display 12 displays an exemplary document 14 and a tool bar 15. As further depicted, the computing device 10 may also include a camera 16 (e.g., a webcam) disposed on the front side 17a of the computing device 10. In some embodiments, additional cameras may be included on the front side 17a and/or backside of the computing device 10.

The first user 20 can be an authorized user of computing device 10 or a person who has no connection to the computing device 10. In an embodiment, a level of authentication and/or a behavioral fingerprint can be determinative of the accessibility of computing device 10. In an embodiment, computing device 10 determines a level of authentication of first user 20 of a computing device 10. In an embodiment, computing device 10 uses the level of authentication to enable or disable automatic functions of the computing device 10. For example, computing device 10 can be configured to automatically open doors to a home, car, or other authorized user-designated item, depending on the level of authentication of the computing device at that time.

In accordance with an embodiment, the level of authentication determination relies at least in part on the behavioral fingerprint of one or more authorized users of computing device 10. The behavioral fingerprint can be determined based on statistical calculations on social network collected data, sensor-provided data, user input and/or a combination of such data. Thus, the level of authentication can be affected by a behavioral fingerprint of an authorized user of computing device 10, which may include social network collected data. The level of authentication can also be affected by various aspects at the time computing device 10 is turned on, such as aspects surrounding computing device 10 and/or aspects of the computing device itself (e.g., movements or detected images). For example, when the computing device 10 of FIG. 1 is turned on by the first user 20 the first user 20 may input a password or pattern or other identifying input, such as a fingerprint, facial recognition or the like. Thus, the level of authentication would recognize the user as an authorized user and then determine whether a behavioral fingerprint is established for that authorized user. Thus, the behavioral fingerprint of an authorized user can be configured to work together to determine accessibility of computing device 10 to first user 20. The level of authentication and the behavioral fingerprint can be directly correlated, or can be configured to enable a level of authentication to override the behavioral fingerprint or vice versa.

For example, a manufacturer of computing device 10 may be able to override a behavioral fingerprint of an authorized user of computing device 10 via the level of authentication, by entering a secret code, such as a manufacturer's accessibility code or the like in order to perform work on computing device 10.

In one or more embodiments, first user 20 can be a network-accessible user for which computing device 10 is just one of many network-accessible devices that network-accessible user 20 may use to access the internet, a cloud server, a mobile network or the like. A network-accessible user can be an owner and/or operator of computing device 10 and other devices. According to an embodiment, network-accessible user 20 can have a behavioral fingerprint that exists outside of computing device 10, that can exist in a cloud computing system for which servers 30 are connected. Devices 30 can further have a presence in the cloud computing system to enable the embodiments described herein. For example, each of devices 30 can be a network-accessible device to which network-accessible user 20 could be connected. Thus, network-accessible user 20 could be a user of one or several devices simultaneously. Network-accessible user 20 could also be a user of a public computing device, for example, if none of devices 30 are available to network-accessible user 20.

Figure 2A:
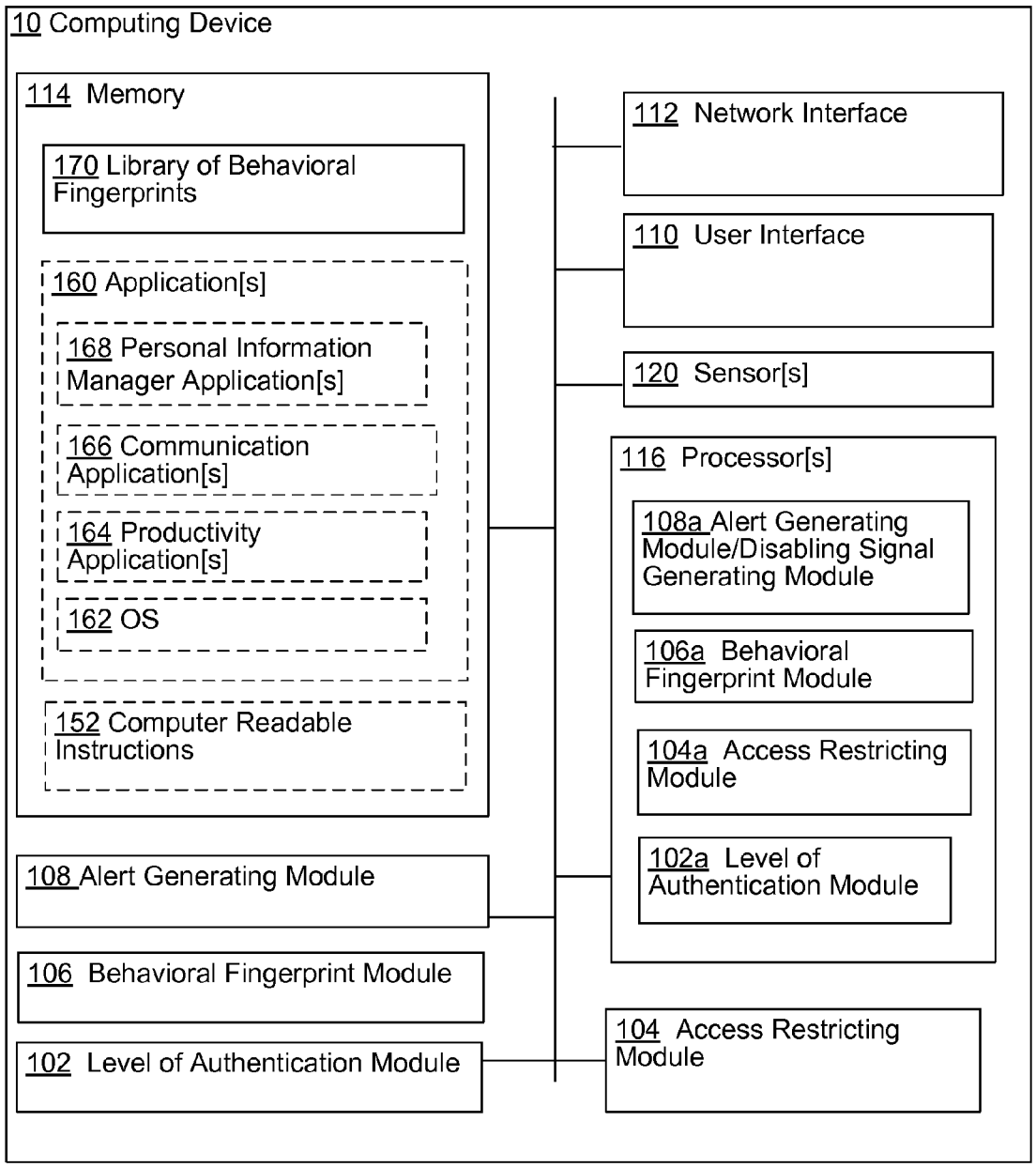
FIG. 2a shows a particular implementation of the computing device 10 of FIG. 1.

Referring now to FIG. 2a, computing device 10 of FIG. 1 illustrates a level of authentication module 102, an access restricting module 104, a behavioral fingerprint module 106, an alert generating module 108, a memory 114 (which may store one or more applications 160 and/or a library of behavioral fingerprints 170), one or more processors 116 (e.g., microprocessors, controllers, etc.), one or more sensors 120, a user interface 110 (e.g., a display monitor such as a touchscreen, a keypad, a mouse, a microphone, a speaker, etc.), and a network interface 112 (e.g., network interface card or NIC).

In various embodiments, the level of authentication module 102 of FIG. 2a is a logic module that is designed to determine a level of authentication associated with first user 20 of computing device 10. The access restricting module 104 is a logic module that is designed to restrict access to one or more items in response to the determination made by the level of authentication module 102. Alert generating module 108 is a logic module that is designed to generate an alert that causes the computing device 10 to communicate a variance to the level of authentication module to restrict capabilities of the computing device and access to the one or more items. The computing device 10 of FIG. 1, can include the three logic modules (e.g., the level of authentication module 102, the restriction module 104, and the alert generating module 108) using circuitry including components such as application specific integrated circuit or ASIC. Alternatively, logic modules including a level of authentication module 102/102a, access restricting module 104/104a, behavioral fingerprint module 106/106a and alert generating module 108/108a can provide the same and similar functionality and correspond to level of authentication module 102, the access restricting module 104, behavioral fingerprint module 106 and the alert generating module 108. Logic modules level of authentication module 102a, the behavioral fingerprint module 106a, the access restricting module 104a, and the alert generating module 108a of the computing device 10 of FIG. 2a can be implemented by the one or more processors 116 executing computer readable instructions 152 (e.g., software and/or firmware) that may be stored in the memory 114.

Note that although FIG. 2a illustrates all of the logic modules (e.g., the level of authentication module 102, the access restricting module 104, the behavioral fingerprint module 106 and the alert generating module 108) being implemented using purely circuitry components such as ASIC, logic modules 102, 102a, 104, 104a, 106, 106a, 108, and 108a may be implemented using a combination of specifically designed circuitry such as ASIC and one or more processors 116 (or other types of circuitry such as field programmable gate arrays or FPGAs) executing computer readable instructions 152. For example, in some embodiments, at least one of the logic modules may be implemented using specially designed circuitry (e.g., ASIC) while a second logic module may be implemented using a processor 116 (or other types of programmable circuitry such as an FPGA) executing computer readable instructions 152 (e.g., software and/or firmware). System requirements could dictate a combination of software and firmware and circuitry to meet the embodiments herein, for example, logic modules could be designed to use the most efficient combination of software/hardware/firmware in order to quickly implement methods and systems within the scope of the present disclosure.

In various embodiments, the memory 114 of the computing device 10 of FIG. 2a may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments the one or more applications 160 stored in memory 114 may include, for example, an operating system 162, one or more productivity applications 164 such as a word processing application or a spreadsheet application, one or more communication applications 166 such as an email or IM application, and one or more personal information manager applications 168 (e.g., Microsoft® Outlook™) and one or more social network applications such as Twitter™ and Facebook™.

Turning now to FIG. 2b illustrating a particular implementation of the level of authentication module 102 and 102a of FIG. 2a. As illustrated, the level of authentication module 102 and 102a may include one or more sub-logic modules in various alternative implementations. For example, in various implementations, the level of authentication module 102/102a may include a behavioral fingerprint interaction module 210, which may further include anomalous action detecting module 212, and a social network confirmation module 216. Level of authentication module 102/102a may further include statistical level determination module 218, a visual cue detecting module 220, including face detecting module 222, and an audio cue detecting module 226, including a voice pattern detecting module 227. Level of authentication module 102/102a may also include a geographic location determination module 230.

The behavioral fingerprint catalogue or library of anomalous actions may be stored as part of behavioral fingerprint library 170 stored in memory 114 (see FIG. 2a) of the computing device 10 of FIG. 1. Therefore, when anomalous changes that match with catalogued or a library of anomalous changes (e.g., as stored in library 170 of the memory 114) have been detected, then at least an inference may be made that the user of computing device 10 is not authenticated, that first user 20 is not an owner of computing device 10, or the like.

In some embodiments, the computing device 10 may include logic that is designed to determine data from a combination of sensors 120 (e.g., of FIG. 2d) that may be processed and analyzed. In some embodiments, computing device 10 determines via one or more image capturing devices 204 (e.g., webcam or digital camera), and/or one or more audio capturing devices 206 (e.g., microphones), and/or images received by computing device via one or more networked devices and/or social networks, whether the computing device 10 is no longer under the control of first user 20, which would cause the level of authentication determined in level of authentication module 102 to alter. For example, the computing device 10 in some cases may employ one or more movement sensors 202 to detect the actual movements of the computing device 10 and/or one or more image capturing devices 204 (possibly including a facial recognition system/application) to determine that a face associated with the first user 20 is not a face associated with an owner of computing device 10. Based on the data provided by both the movement sensors 202 and/or the image capturing devices 204 at least an inference may be made that the computing device 10 requires an alteration to the level of authentication.

Alternatively or additionally, in some embodiments, the computing device 10 may be endowed with a facial recognition system (e.g., facial recognition software) that when employed with one or more image capturing devices 204 may be used in order to determine the presence or absence of a face associated with an owner of computing device 10 and compare to the first user 20. If the face associated with the owner of computing device 10 does not match first user 20 then a determination may be made to alter the level of authentication associated with first user 20. In addition to face recognition, other logic can include using the field of view of image capturing device 16 or audio capturing devices of the computing device 10 to identify an authorized user of computing device through other recognition processes, such as fingerprint, retina, voice verification, global positioning system (GPS) locating of the owner of computing device 10 or other personal identification.

In various embodiments, the one or more items that access may be restricted to may be one or more electronic items that may have been open or running prior to a level of authentication change of the computing device 10 and/or electronic items that were accessible through the computing device 10 (e.g., electronic documents and files that were stored in the computing device 10) prior to an alteration of the level of authentication of the computing device 10.

Statistical level determination module 218 may be configured to apply statistical algorithms, comparative analysis, statistical probability functions, and the like to determine a statistical level of authentication for computing device 10. In one embodiment, statistical level determination module 218 may apply a weighting function, which determines a level of authentication based on received data from scanners, and other devices, and a behavioral fingerprint, with each received data having a predetermined weight regarding relevance to authentication. Statistical level determination module 218 may additionally or alternatively analyze anomalous actions to determine or infer the level of authentication. To further determine or at least infer that the computing device 10 should have a low level of authentication, statistical examination/analysis of the detected anomalous action movements of the computing device 10 may involve comparing the detected anomalies of the computing device 10 with catalogued or library anomalous action movements (which may be stored in the memory 114 of the computing device 10) that are identified as being movements associated with, for example, a transfer of computing device 10, a dropping of computing device 10, an action incompatible with the stored predicted actions of an authorized user, or an alert received from a social network that an expected or previously possessory authorized user does not have possession of computing device 10.

Computing device 10 may maintain in its memory 114 (see FIG. 2A) a behavioral fingerprint library 170 that may include a catalogue or library of actions, inputs, movements, received network data including anomalous data that have been previously identified as anomalous that may occur when, for example, a computing device 10 is stolen or used by another user, or a social network query fails to return appropriate confirmatory data that confirms that an authorized user is in control of computing device 10. Thus, when anomalous movements, inputs or actions match something in the library anomalous movements, inputs or actions have been detected, a determination or inference may be made that the level of authentication must be altered. The level of authentication can be lowered, such that first user 20 is determined to have a lowest level of authentication.

Behavioral fingerprint interaction module 210 may receive data from behavior fingerprint module 106/106a and/or behavioral fingerprint library 170. Behavioral fingerprint interaction module 210 can apply the data relating to one or more behavioral fingerprints of authorized users to determine a level of authentication. More particularly, level of authentication module 102/102a may be configured to receive a behavioral fingerprint as a list of activities, warnings, anomalous actions, and the like. Specific details related to the level of authentication module 102/102a as well as the above-described sub-modules of the level of authentication module 102 will be provided below with respect to the operations and processes to be described herein.

Figure 2C:
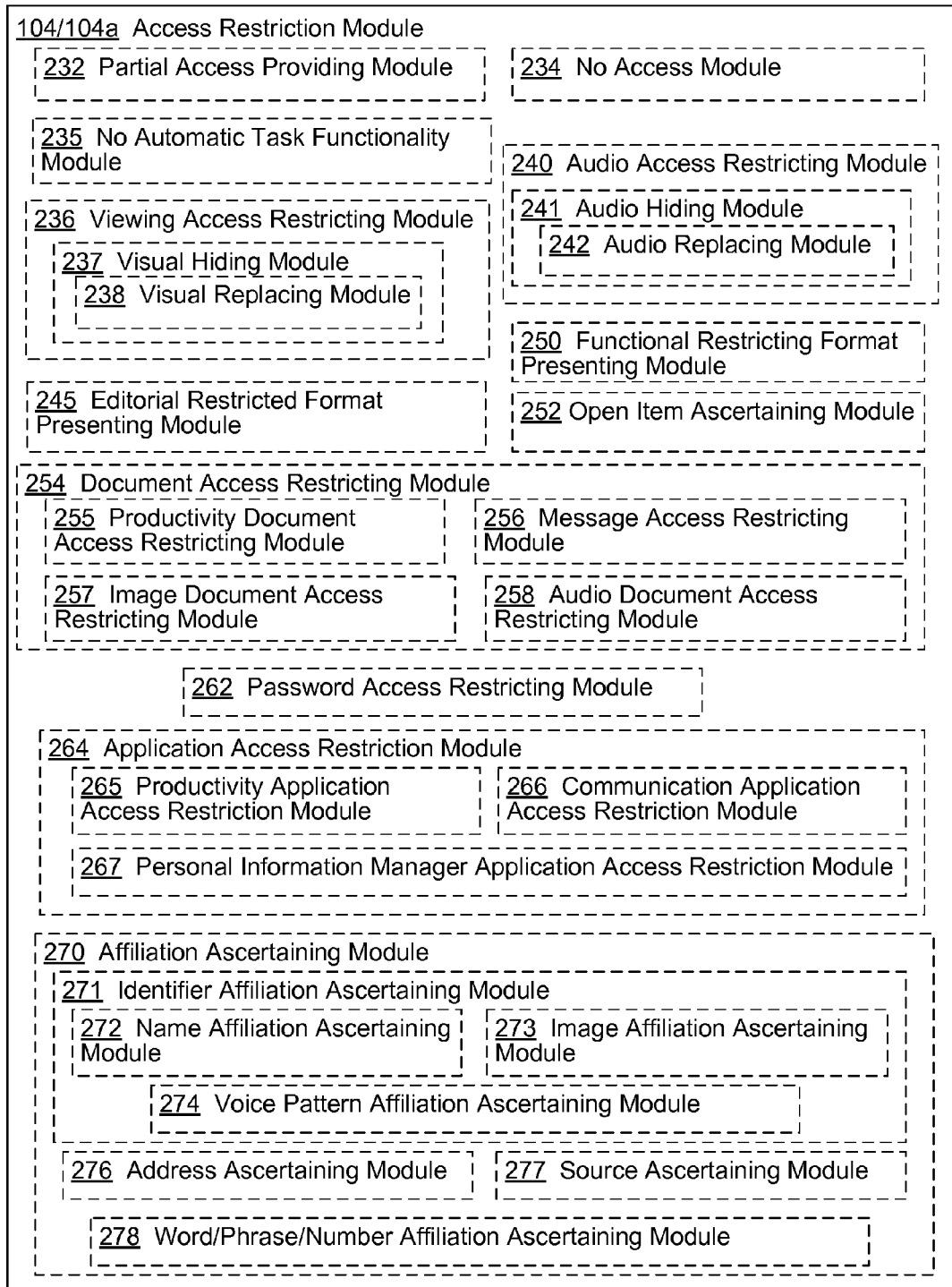
FIG. 2c shows another perspective of the access restricting module 104.

Referring now to FIG. 2c illustrating a particular implementation of the access restricting module 104/104a of FIG. 2a. Access restricting module 104/104a of the computing device 10 of FIG. 2c can be configured to restrict access (e.g., hiding or disguising, denying viewing or editorial access, converting to read-only form, and so forth) via the computing device 10 to one or more items (e.g., documents, image or audio files, passwords, applications, and so forth) or preventing one or more actions by computing device 10.

As illustrated, the access restricting module 104/104a may include one or more sub-logic modules in various alternative implementations. For example, in various implementations, the access restricting module 104/104a may include a partial access providing module 232, a no access module 234, a viewing access restricting module 236 (which may further include a visual hiding module 237 that may further include a visual replacing module 238), an audio access restricting module 240 (which may further include an audio hiding module 241 that may further include an audio replacing module 242), an editorial restricted format presenting module 245, a functional restricting format presenting module 250, an open item ascertaining module 252, a document access restricting module 254 (which may further include a productivity document access restricting module 255, a message access restricting module 256, an image document access restricting module 257, and/or an audio document access restricting module 258), and/or a password access restricting module 262. As further illustrated in FIG. 2c, the access restricting module 104/104a, in various implementations, may also include an application access restriction module 264 (which may further include a productivity application access restriction module 265, a communication application access restriction module 266, and/or a personal information manager application access restriction module 267), and/or an affiliation ascertaining module 270. As further illustrated in FIG. 2c, in various implementations, the affiliation ascertaining module 270 may further include one or more sub-modules including an identifier affiliation ascertaining module 271 (which may further include a name affiliation ascertaining module 272, an image affiliation ascertaining module 273, and/or a voice pattern affiliation ascertaining module 274), an address ascertaining module 276, a source ascertaining module 277, and/or a word/phrase/number affiliation ascertaining module 278.

An example of how access restricting module 104/104a operates includes determining whether one or more productivity documents are word processing documents and then restricting access to such items may involve hiding or disguising representations of the documents in a directory (e.g., deleting document names or subject headings in the directory or replacing the document names or subject headings in the directory with pseudo-names or subject headings). Alternatively, a non-editable form of the documents may be presented in order to restrict access to such documents. If, on the other hand, the one or more items are one or more software applications, then restricting access to such items may involve denying use of one or more functionalities associated with the items (e.g., applications). For example, if the one or more items include a word processing application, then restricting access to such an application may involve, although allowing general access to such an application, disabling one or more editing functions of the application.

Figure 2D:
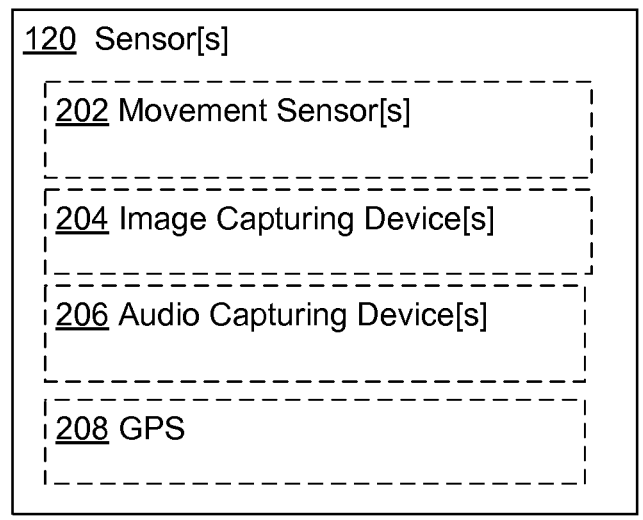
FIG. 2d shows various types of sensors 120 that may be included in the computing device 10.

FIG. 2d illustrates the various types of sensors 120 that may be included with the computing device 10 of FIG. 1. As illustrated, the sensors 120 that may be included with the computing device 10 may include one or more movement sensors 202, one or more image capturing devices 204 (e.g., a web cam, a digital camera, etc.), one or more audio capturing devices 206 (e.g., microphones), and/or a global positioning system (GPS) 208 (which may include any device that can determine its geographic location including those devices that determine its geographic location using triangulation techniques applied to signals transmitted by satellites or by communication towers such as cellular towers).

One way to monitor actions taken by first user 20 with respect to computing device 10 is to directly detect such actions using one or more sensors shown in FIG. 2d that are designed to directly detect/measure activities by user 20 of computing device 10. These sensors can be integrated with computing device 10 and may be used to directly detect the action taken with respect to the computing device 10 as the computing device 10 is being used by first user 20. For example, fingerprint detection sensor, or facial recognition sensors can detect whether first user 20 is an authorized user of computing device 10. Once first user 20 is associated with an authorized user of computing device 10, the behavioral fingerprint associated with the associated authorized user can be accessed. The behavioral fingerprint module 106/106a then can process data received by behavioral fingerprint library 170, and provide the behavioral fingerprint data to level of authentication module 102. In one embodiment, level of authentication module 102 receives the behavioral fingerprint data from behavioral fingerprint library 170 and determines the accessibility of computing device 10 based at least in part on the determined behavioral fingerprint.

Figure 2E:
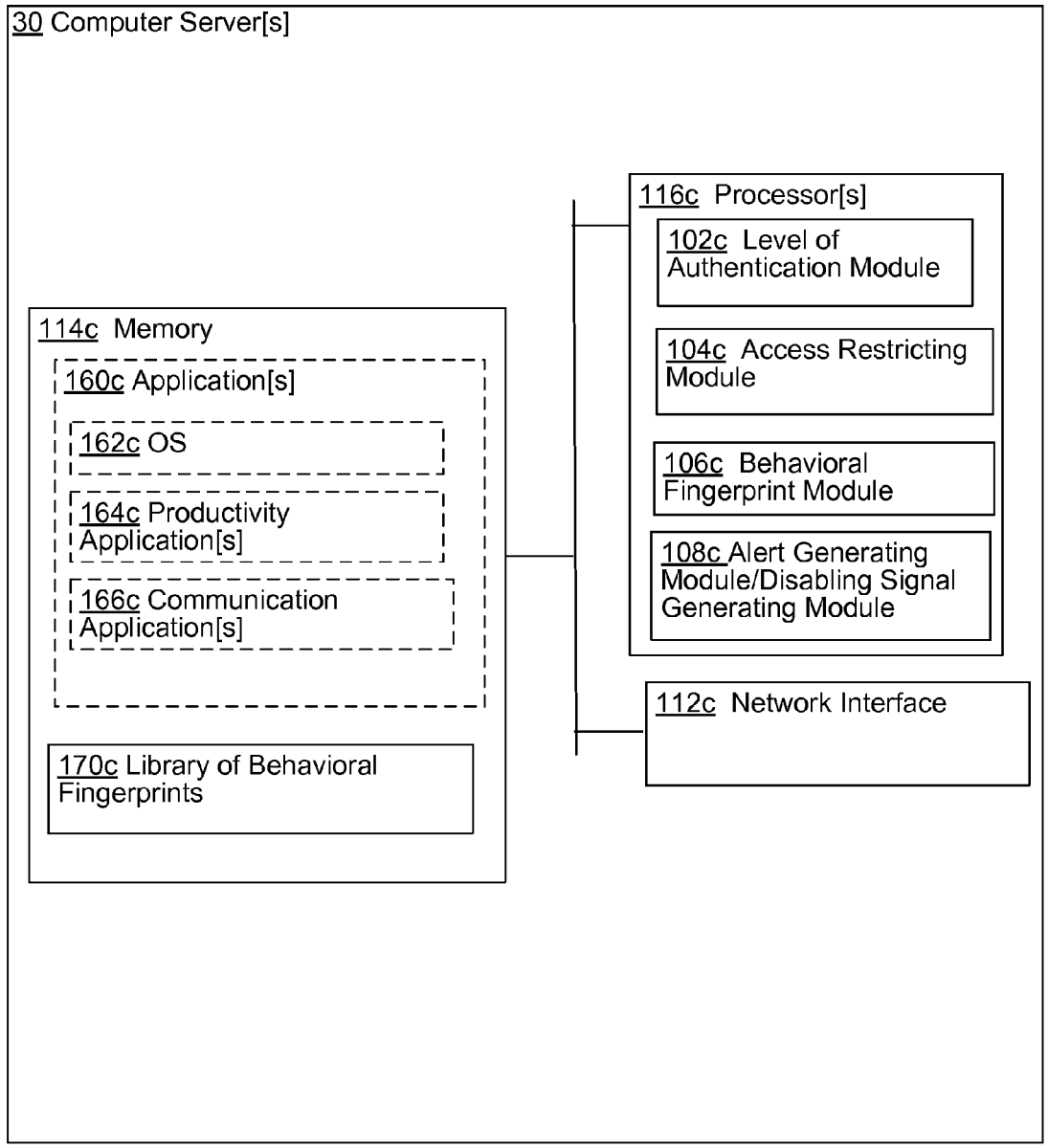
FIG. 2e shows a particular implementation of the computer server 30 of FIG. 1.

Referring now to FIG. 2e, computer server 30 of FIG. 1 can include similar functionality to computing device 10. As such, FIG. 2e illustrates a level of authentication module 102c, an access restricting module 104c, a behavioral fingerprint module 106c, an alert generating module 108c, a memory 114c (which may store one or more applications 160c and a library of behavioral fingerprints 170c), one or more processors 116c (e.g., microprocessors, controllers, etc.), and a network interface 112c (e.g., network interface card or NIC).

In various embodiments, logic modules level of authentication module 102c, the behavioral fingerprint module 106c, the access restricting module 104c, and the alert generating module 108c of the computer server 30 of FIG. 2e can be implemented by the one or more processors 116c executing computer readable instructions (e.g., software and/or firmware) that may be stored in the memory 114.

Note that FIG. 2e illustrates the logic modules (e.g., the level of authentication module 102c, the access restricting module 104c, the behavioral fingerprint module 106c and the alert generating module 108c) being implemented using processor modules, however, purely circuitry components such as an ASIC may be implemented using a combination of specifically designed circuitry such as ASIC and one or more processors 116c (or other types of circuitry such as field programmable gate arrays or FPGAs) executing computer readable instructions. For example, in some embodiments, at least one of the logic modules may be implemented using specially designed circuitry (e.g., ASIC) while a second logic module may be implemented using a processor 116c (or other types of programmable circuitry such as an FPGA) executing computer readable instructions (e.g., software and/or firmware). System requirements could dictate a combination of software and firmware and circuitry to meet the embodiments herein, for example, logic modules could be designed to use the most efficient combination of software/hardware/firmware in order to quickly implement methods and systems within the scope of the present disclosure.

In various embodiments, the memory 114c of the computer server 30 of FIG. 2e may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments the one or more applications 160c stored in memory 114c may include, for example, an operating system 162c, one or more productivity applications 164c such as a word processing application or a spreadsheet application, or one or more communication applications 166c.

Figure 3A:
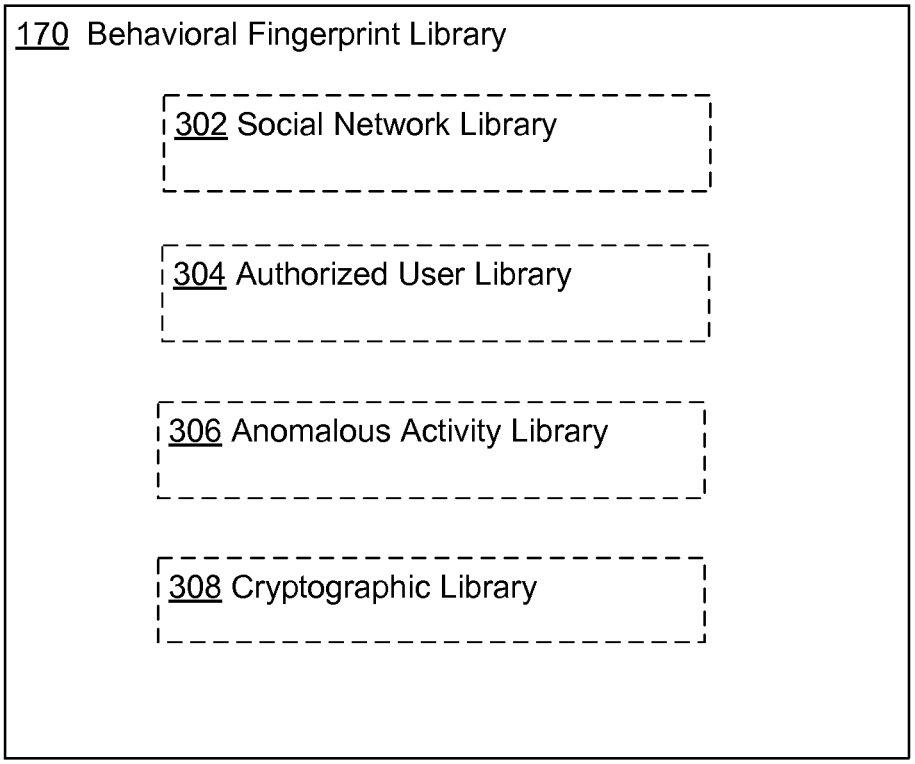
FIG. 3a shows another perspective of the behavioral fingerprint library 170.

Referring now to FIG. 3a, behavioral fingerprint library 170 (and 170c) is shown with more particularity. Computing device 10 and computer server 30 may maintain in its memory 114/114c (see FIG. 2a and FIG. 2e) a behavioral fingerprint library 170/170c (see also, FIG. 2a and FIG. 2e), which is a catalog or library that identifies a plurality of actions by one or more users, including network interactions, including social network interactions, alerts relating to one or more users and the like that when detected as occurring at least infers (e.g., implies) that computing device 10 is being used by an authorized user. FIG. 3a includes modules and functionalities that can be performed by either or both of computing device 10 and/or computer server 30. In the case of computer server 30, the functionalities of the various modules can be replicated as needed for a plurality of computer devices and authorized users of one or more computer devices, as will be appreciated by one of ordinary skill in the art. For example, computer server 30 can be one of a computer farm, such as may exist in a cloud computing setting, and enable productivity applications 164c and communications applications 166c to be performed via cloud computing technologies. As such appropriate replications can be included within the scope of the present application.

As shown, FIG. 3a includes a social network library 302, authorized user library 304, anomalous activity library 306 and cryptographic library 308.

Social network library 302 can be configured to store interactions between authorized users and other entities. For example, one or more social networks could include Facebook™ and/or Twitter™. Social network library 302 can be configured to store messages from one or more social networks such that behavioral fingerprint module 106/106a can determine if action needs to be taken based on the messages. For example, an authorized user of computing device 10 and/or another device via computer server 30, or over network 50 could post a message via a social network that computing device 10 is no longer under his/her control. Computing device 10 could automatically receive such a post over a network connection, from computer server 30 via network interface 112/112c, to social network library 302, which would create a low level of authentication to first user 20, possibly before first user 20 attempts to use computing device 10. A higher level of authentication would need to be reestablished by an authorized user of computing device 10 after return of possession of the computing device 10 for an authorized user to have full functionality of computing device 10 or to restore a prior level of authentication or the like.

Social network library 302 can identify any messages with indicative aspects relative to authentication. Network library 302 can be configured to identify key words, such as "stolen" or "lost" and pass on a warning notification to behavioral fingerprint module and/or level of authentication module for further processing. In one embodiment, network library 302 can apply a search algorithm to identify key words to assist in determining behaviors that are both authentication positive and authentication negative. For example, "stolen", "lost" are authentication negative key words. Conversely, a current message from a current "friend" on Facebook™ and a response using computing device 10 would be authentication positive. Any indications that an authorized user of computing device 10 is interacting with previously verified and identified "friends" on Facebook™ would be authentication positive.

FIG. 3a also includes authorized user library 304, which can include a library of authorized users of computing device 10. Computing device 10 and computer server 30 can be associated with one or more authorized users. The authorized users can include an owner or several owners, co-owners, and users with varying degree of permission for using computing device 10 or other computer devices. Authorized user library 304 can include profiles for each authorized user, including passwords. Behavior fingerprint module 106/106a/106c and level of authentication module 102/102a/102c can be associated with one or more authorized users, or associated with just one authorized user, in accordance with system requirements. For example, each authorized user can have a designated behavioral fingerprint. When first user 20 is identified as one of a plurality of authorized users, the behavioral fingerprint for that authorized user would be associated with first user 20, and a level of authentication can be then determined.

FIG. 3a further illustrates anomalous activity library 306. Anomalous activity library 306 can include data stored that indicates an anomalous activity has taken place. In one embodiment, an authorized user can store or log activities that the user has predetermined to be anomalous. For example, an authorized user may provide a list of area codes for which the computing device operated as a phone, would consider anomalous. A list could include all foreign country phone numbers, specific area codes or the like that the authorized user would not normally call from computing device 10. An authorized user could further identify actions that would be anomalous for that authorized user. Identified action could include time of day usage, GPS-determined locations identified as locations of computing device 10 the authorized user considered anomalous, and application-specific actions identified as anomalous. An example of application-specific actions could include deletion of significant amounts of data, logging into a social network as a user that is not an authorized user of computing device 10, and the like. In an embodiment, anomalous activity library 306 further logs activities that are received upon via a network that are determined to be anomalous. For example, a social networked entity can post a message that is monitored by computing device 10 and/or computer server 30 that includes a warning or other indication of unsafe conditions associated with computing device 10. Anomalous activity library 306 could be configured to log the warning so that the behavioral fingerprint module can determine whether to associate the warning with an authorized user.

FIG. 3a further illustrates cryptographic library 308, which can include data such as passwords, public/private key pair data, cryptographic keys such as the types used in block ciphers such as Triple DES or substitution permutation algorithms like AES. As will be appreciated by those of skill in the art, Triple DES data is encrypted with the first key, decrypted with the second key, and finally encrypted again with the third key, resulting in up to a 168 bit encryption. AES encryption can use variable key lengths. For example, keys used in AES can have lengths of 128, 192, or 256 bits to encrypt blocks with a length of 128, 192 or 256 bits (all nine combinations of key length and block length are possible). As will be appreciated by those of skill in the art with the benefit of the present application, key lengths can change over time as computing capabilities change and progress. As such, the key lengths described herein are exemplary only and not intended to be limiting in any way. Cryptographic library 308 can receive data from social networks or designated sources to create a key pair or to regenerate a key or key pair. For example, as part of an authorized user's behavioral fingerprint, the authorized user could assign parts of a key, either asymmetric or symmetric, to several "friends" on a social network. In the current state of the art, an asymmetric key could be a "public key" and would not need to be kept secret, and a symmetric key could be a "private key" or a "secret" which would need to be protected. For purposes of the present application, in embodiments presented herein, the terms "asymmetric key," "public key," and "private key" contemplate possible changes in cryptography algorithms for which different types of asymmetric keys could require protection. Furthermore, embodiments herein contemplate the re-emergence and/or generation of cryptography systems wherein cryptographic keys may be made public and the specific cryptographic algorithms used to generate cryptographic keys may need to be kept secret. For example, in an attempt to thwart piracy, some computer gaming software systems now execute certain security code(s) on a remote server instead of the local device. In this case, the data may be known, but the code implementing the algorithm is kept secret. The use of the terms asymmetric, public, and private should not be interpreted as restricted to the current form of public/private key pair encryption, but rather to the general case of establishing a means of secure communication with some aspect being kept secret. For example, key encryption may be either symmetrical or asymmetrical, with some aspect being known. If an anomalous event occurs which causes the authorized user's behavioral fingerprint to be compromised, an authorized user can reestablish a behavioral fingerprint by notifying each designated "friend" in the social network to send a portion of the key, so that when the key is regenerated, the behavioral fingerprint is rebuilt.

Figure 3B:
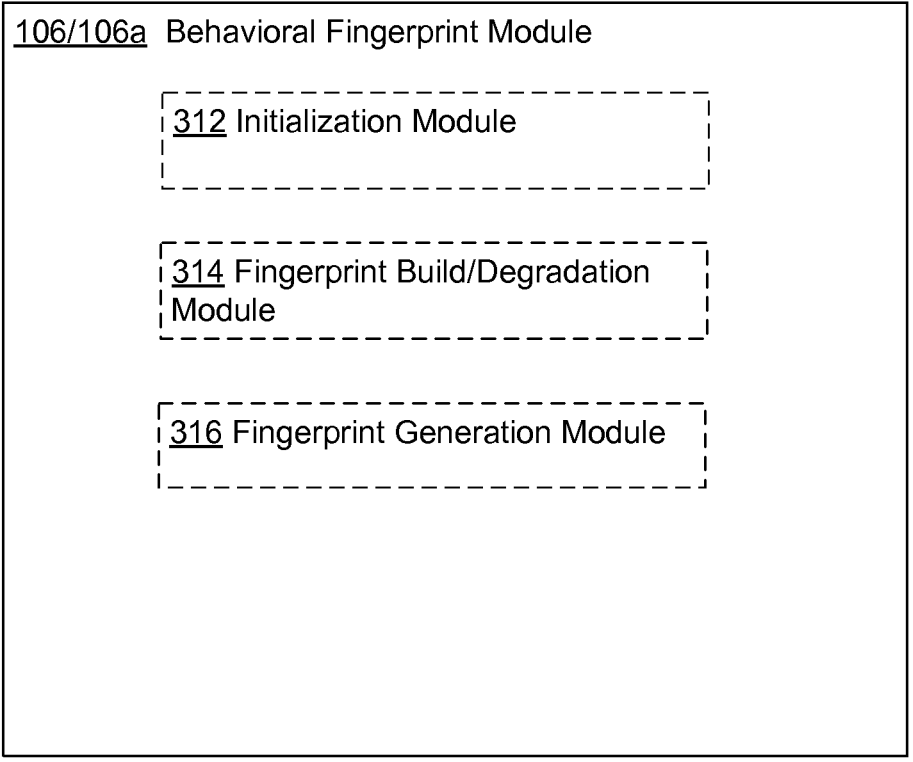

Referring to FIG. 3b, behavioral fingerprint module 106/106a is shown in more detail. Behavioral fingerprint module 106/106a receives data from behavioral fingerprint library 170. Behavioral fingerprint module 106/106a is shown including initialization module 312, fingerprint build/degradation module 314, and fingerprint generation module 316.

Initialization module 312 may be configured to determine an initial behavioral fingerprint associated with an authorized user. The initial behavioral fingerprint can be based on entered data by authorized user, and received data from behavioral fingerprint library 170 and received data from sensor[s] 120.

Fingerprint build/degradation module 314 may be configured to determine whether initial behavioral fingerprint should be altered due to received data from behavioral fingerprint library 170, or sensor[s] 120.

Fingerprint generation module 316 may be configured to determine a current behavioral fingerprint for a first user 20 determined to be an authorized user attempting to operate computing device 10. Fingerprint generation module 316 can also be configured to determine a behavioral fingerprint for an established authorized user based on network received data while computing device 10 is connected to a network connection. In the case of fingerprint generation module 316 existing in a cloud computing setting or computer server 30, fingerprint generation module 316 may be configured to determine a network-based behavioral fingerprint for a plurality of users when first logging into network 50 or cloud computing logging to computer server 30.

A behavioral fingerprint can be determined before first user 20 handles computing device 10. In some embodiments, a manufacturer can set both a behavioral fingerprint and a level of authentication based on information received by first user 20 when ordering computing device 10 or first handling computing device 10. For example, received passwords and the like. In a computer server 30 environment, a behavioral fingerprint can be transferred from another device, such as devices 60. Whether the level of authentication or the behavioral fingerprint controls the accessibility and actions available to first user 20 depends on system requirements and can be adjusted. For example, a behavioral fingerprint may indicate that computing device 20 has been stolen, and, in such a case, the behavioral fingerprint library 170 could be configured to notify level of authentication module 102 of exigent circumstances requiring a reduced access to computing device 10. Likewise, computer server 30 could hold the behavioral fingerprint library 170c and notify a level of authentication module 102 and 102c of exigent circumstances.

Also, a behavioral fingerprint module 106/106a/106c may be configured to rebuild some type of asymmetric key pair or a Triple DES (Data Encryption Standard) or AES (Advanced Encryption System) type key after an anomalous event, and notify level of authentication module that an authorized user should have a level of authentication that allows access.

Behavioral fingerprint module 106/106a/106c can receive data related to various types of movements, actions and inputs related to computing device 10. For example, an initial behavioral fingerprint generated by behavioral fingerprint module 106/106a/106c could be configured to communicate to level of authentication logic module 102/102a/102c predetermined inputs to computing device 10 and/or computer server 30 to provide access.

Other examples of the type of movements, actions and inputs that may be tracked for purposes of determining a behavioral fingerprint may include, for example, individually or in combination, those tracked using one or more sensors 120 that may be included with the computing device 10 as illustrated in FIG. 2d. For example, in various embodiments, one or more movement sensors 202 can directly detect movements, and/or other types of sensors (e.g., image capturing devices 204, audio capturing devices 206, etc.) that may be able to indirectly detect actions may be employed to confirm actions taken with respect to the computing device 10 as will be further described herein. Another type of sensor can determine a particular way in which the first user types on a keyboard of the computing device or uses pressure on the computing device. For example, a first user may repetitively use particular keys with a particular pressure or the like. The key pattern could be used in behavioral fingerprint module 106/106a to build on a behavioral fingerprint as in fingerprint build/degradation module 314, for example.

The type of access to be restricted in response to determining that the computing device 10 or computer server 30 has an altered level of authentication for first user 20 will depend on a number of factors including what types of actions are requested. For example, if the one or more items are one or more software applications (herein "applications"), then the access restriction may include restriction to one or more functionalities of the one or more applications. Alternatively, access restriction and disabling of the one or more applications in some cases may mean access to the one or more applications being completely blocked or hidden. In contrast, if the one or more items are one or more electronic documents (e.g., productivity documents, image or audio files, etc.), then the access restriction that may be applied to such items may relate to editorial access restrictions (e.g., restrictions to the modifications, deletion, addition, and so forth of the items) of the items as a function of the level of authentication. Likewise, automatic actions and tasks may be restricted or disabled as a function of the level of authentication and/or the behavioral fingerprint.

In some cases, restricting access to the one or more items may mean restricting viewing access to the one or more items while in other cases it may mean restricting audio access to the one or more items. In some cases, restricting access to the one or more items may mean complete restriction to access of the one or more items and/or one or more actions, while in other cases, restricting access to the one or more items may mean only a partial restriction to access of the one or more items. In any event, a more detailed discussion related to the various types of access restrictions that may be applied to the one or more items will be provided below with respect to the operations and processes to be described herein.

In some embodiments, the computing device 10 in response to restricting access to the one or more items and preventing one or more automatic actions, may be designed to generate an alert that indicates that the computing device 10 has been reconfigured to restrict access to the one or more items and disable the one or more automatic actions. Note that in some embodiments, the alert can go back and forth between computer server 30 and computing device 10, depending on the source of the alert and the exigency of the alert.

Figure 4:
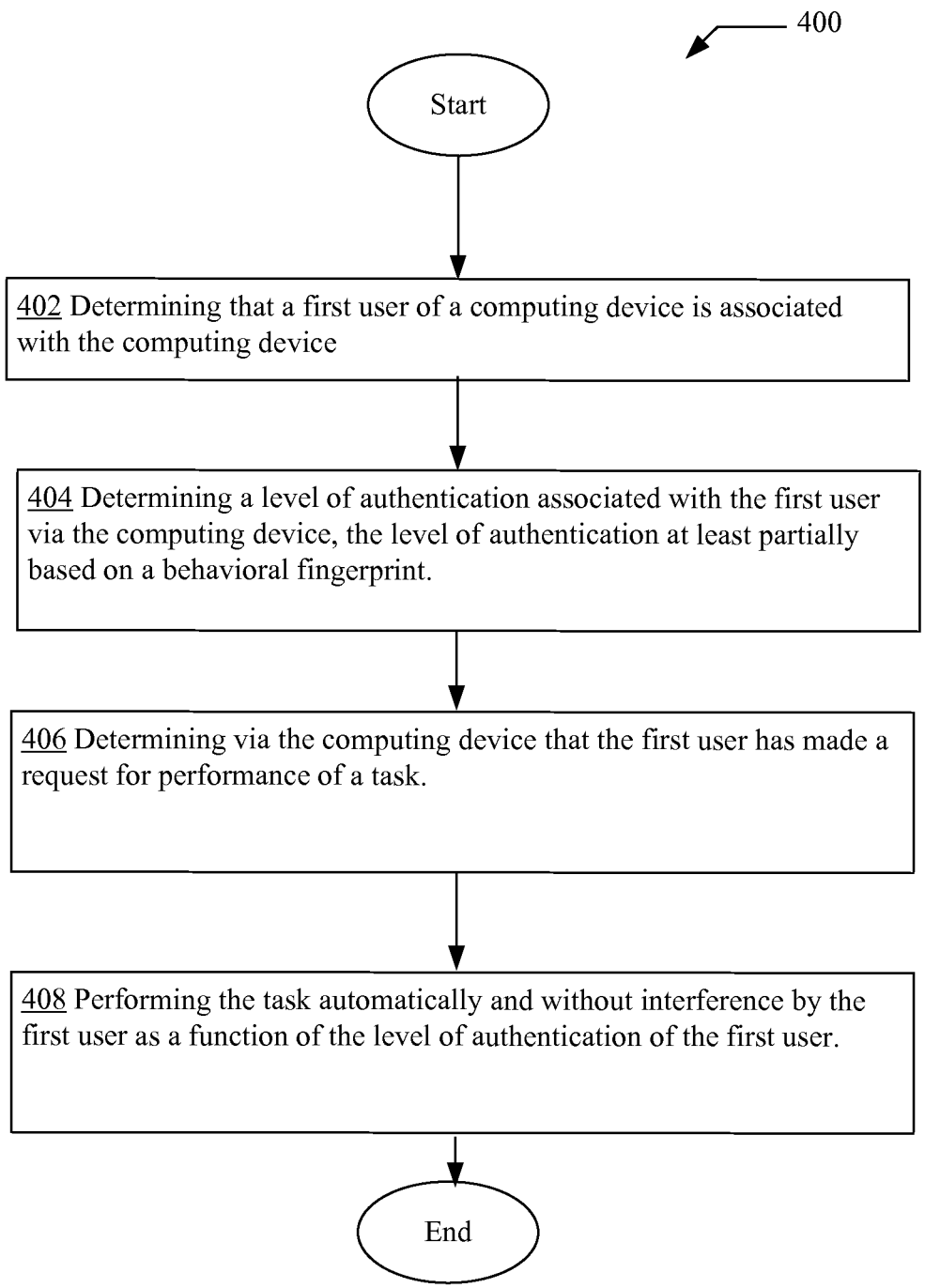
FIG. 4 is a high-level logic flowchart of a process depicting an implementation of the computing device.

A more detailed discussion related to the computing device 10 of FIGS. 1-3 will now be provided with respect to the processes and operations to be described herein. FIG. 4 illustrates an operational flow 400 representing example operations for, among other things, restricting access via a computing device to one or more items (e.g., software applications, electronic documents including productivity documents, audio or image files, electronic messages including emails, passwords, and so forth). In FIG. 4 and in the following figures that include various examples of operational flows, discussions and explanations will be provided with respect to the exemplary environment 100 described above and as illustrated in FIG. 1 and/or with respect to other examples (e.g., as provided in FIG. 2a) and contexts. However, it should be understood that the operational flows may be executed in a number of other environments and contexts, and/or in modified versions of FIGS. 2a, 2b, 2c, 2d, and FIGS. 3a and 3b. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one of a machine, an article of manufacture, or a composition of matter unless indicated otherwise.

In any event, after a start operation, the operational flow 400 of FIG. 4 may move to an association operation 402 for determining that a first user of a computing device is associated with the computing device. For instance, and as an illustration, the level of authentication module 102/102a of the computing device 10 of FIG. 1 determining that a computing device 10 used by a first user 20 (e.g., an unknown user having inferior access rights or an authorized user of the computing device 10 of FIG. 1) has turned on and/or logged onto computing device 10. Note that in various implementations, the first user 20 may use the computing device 10 by logging onto the computing device 10 and/or by employing the computing device 10 to access one or more applications and/or content that may be accessible through the computing device 10. In addition to the association operation 402, operational flow 400 may also include a level of authentication operation 404 for determining a level of authentication associated with the first user via the computing device, the level of authentication at least partially based on a behavioral fingerprint as further illustrated in FIG. 4. For instance, level of authentication module 102/102a determining a level of authentication for first user 20. The level of authentication can be configured to restrict access to the one or more items/actions as a function of the level of authentication assigned to first user 20. If first user 20 is identified as an authorized user, level of authentication module 102/102a can be configured to take into account a behavioral fingerprint associated with that authorized user.

In addition to level of authentication operation 404, operational flow 400 includes operation 406, determining via the computing device that the first user has made a request for performance of a task, for example, computing device 10 user interface 110 receiving an input from first user 10 to access an application 160 or the like. Operation 406 is followed by operation 408, performing the task automatically without interference by the first user as a function of the level of authentication of the first user. For instance, the level of authentication module 102/102a of the computing device 10 of FIG. 1 determining automatically without interference (e.g., without prompting) that first user 20 is an authorized user and activating one of applications 160 to perform a task automatically.

Figure 5A:
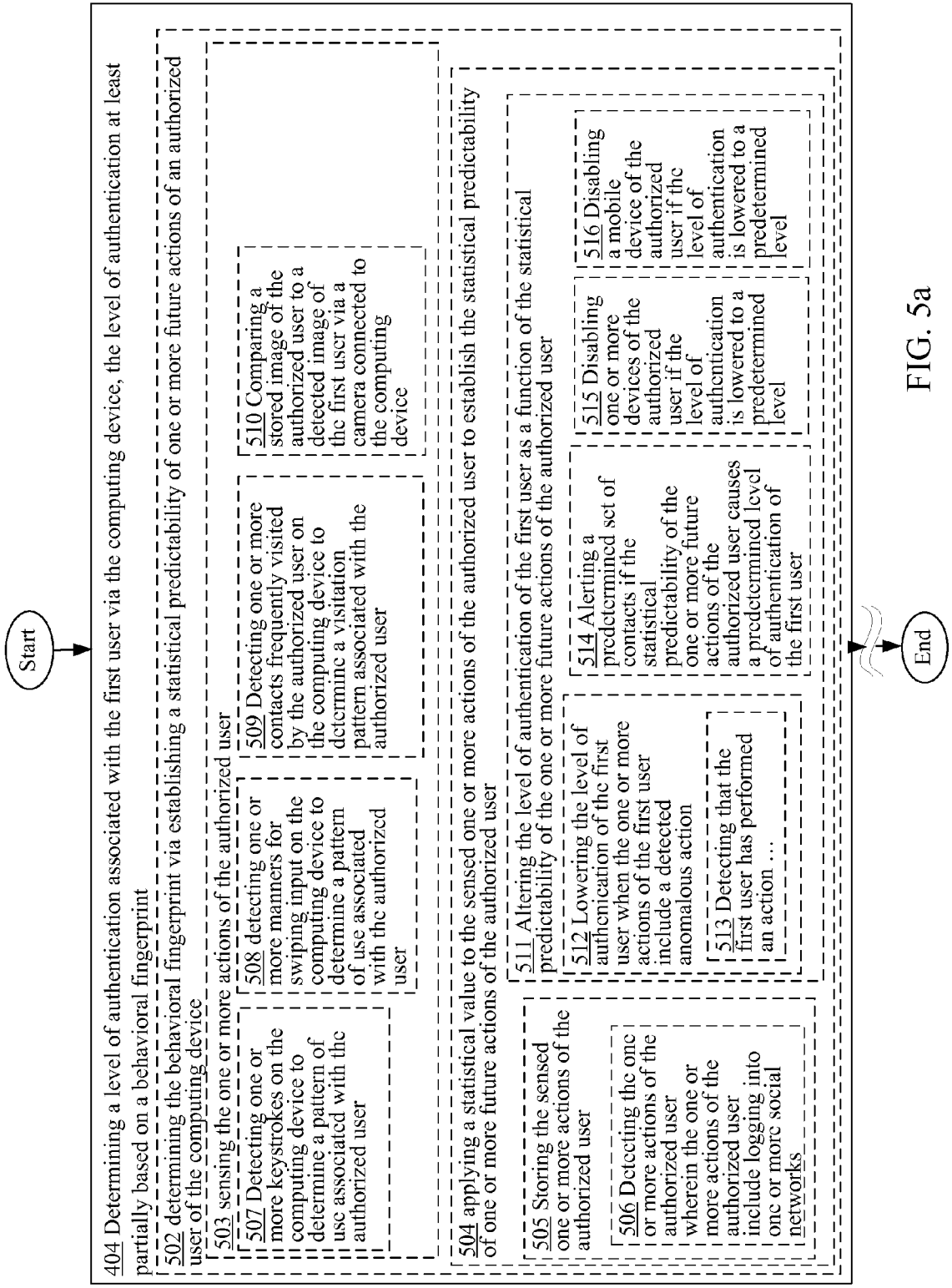
FIG. 5a is a high-level logic flowchart of a process depicting alternate implementations of the computing device operation 404 of FIG. 4.
Figure 5B:
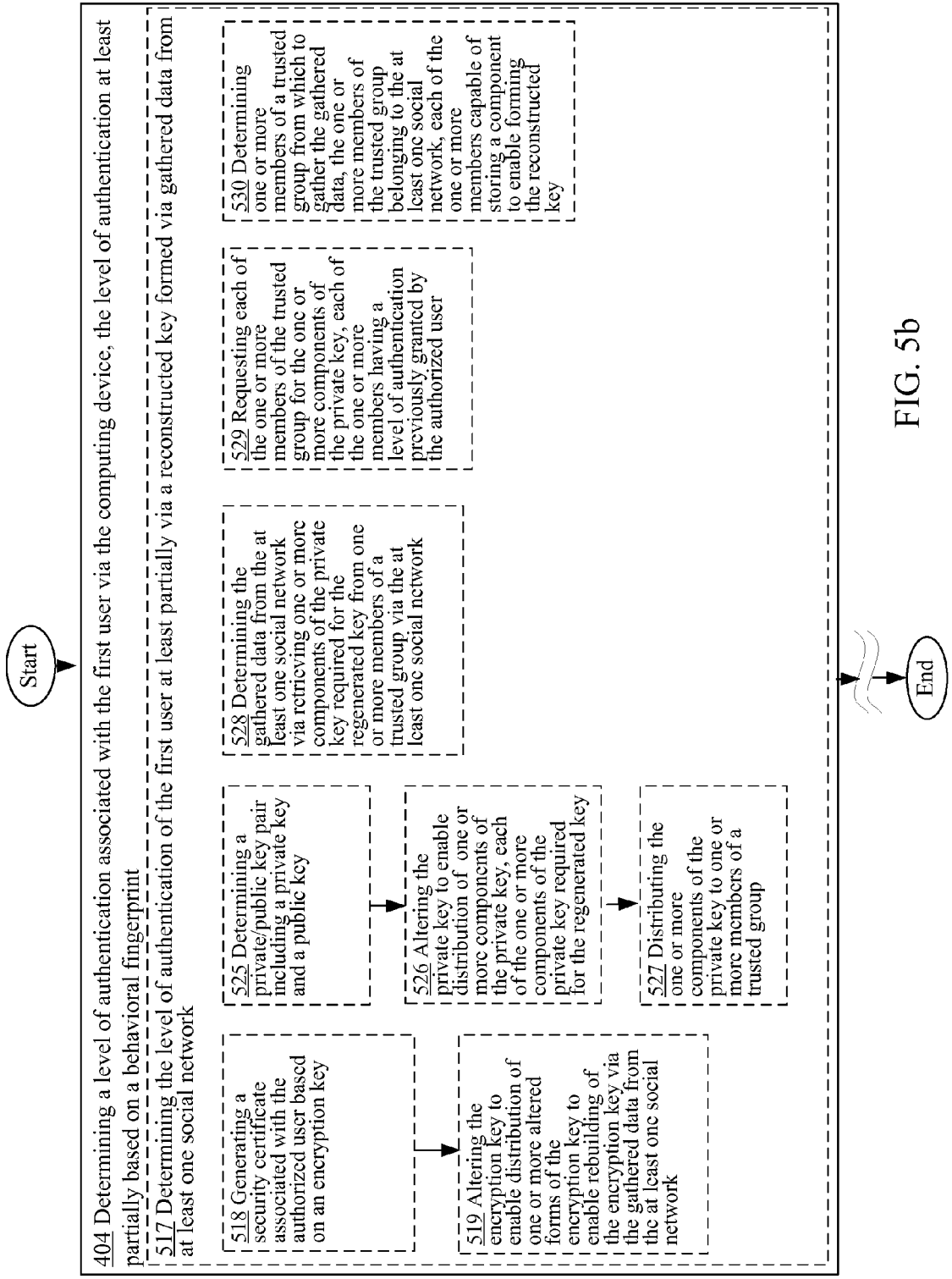
FIG. 5b is a high-level logic flowchart of a process depicting alternate implementations of the computing device operation 404 of FIG. 4.
Figure 5C:
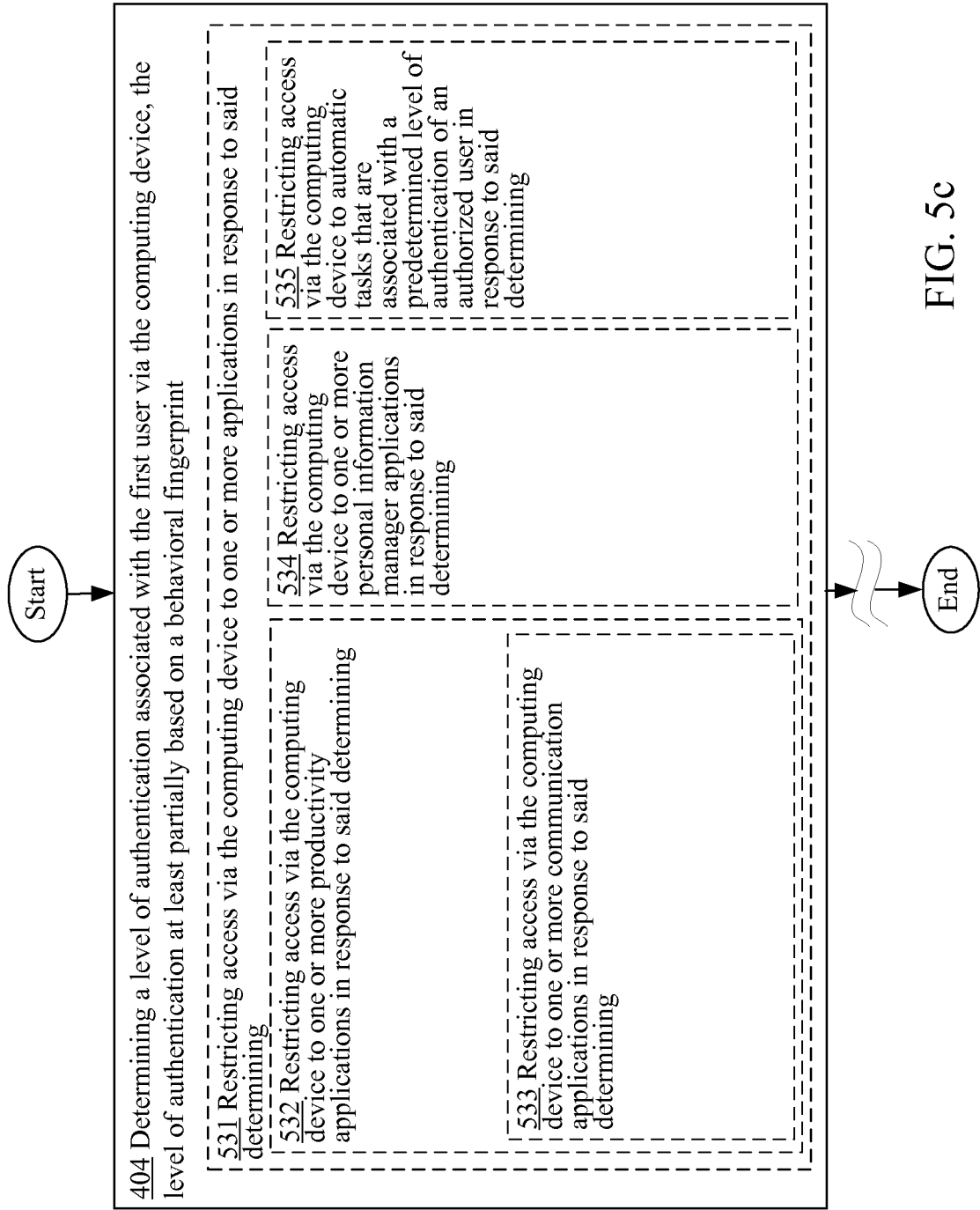
FIG. 5c is a high-level logic flowchart of a process depicting alternate implementations of the computing device operation 404 of FIG. 4.

As will be further described herein, the level of authentication operation 404 of FIG. 4 may be executed in a variety of different ways in various alternative implementations. FIGS. 5a, 5b, 5c, for example, illustrate at least some of the alternative ways that operation 404 of FIG. 4 may be executed in various alternative implementations. For example, in various implementations, operation 404 of FIG. 4 may include an operation 502 for determining the behavioral fingerprint via establishing a statistical predictability of one or more future actions of an authorized user of the computing device as depicted in FIG. 5a. For instance, behavioral fingerprint module 106/106a determining a behavioral fingerprint of first user 20 by establishing that first user 20 is an authorized user of computing device 10, and generating a behavioral fingerprint via fingerprint build/degradation module 314 and fingerprint generation module 316, which can include statistical calculations based on prior actions to predict future actions of an authorized user.

As further illustrated in FIG. 5a, in some implementations, the level of authentication operation 502 may additionally or alternatively include an operation 503 for sensing the one or more actions of the authorized user. For instance, sensors 120 and level of authentication module 102/102a of the computing device 10 of FIG. 1 determining that first user 20 is an authorized user based, at least in part, on data provided by one or more sensors 120.

Data from various types of sensors 120 may be used in order to determine a level of authentication of the computing device 10. For example, and as further illustrated in FIG. 5a, operation 503 may be followed by an operation 504 applying a statistical value to the sensed one or more actions of the authorized user to establish the statistical predictability of one or more future actions of the authorized user. For instance, the level of authentication module 102/102a of the computing device 10 of FIG. 1 applying statistical level determination module 218 to actions taken by an authorized user with a behavioral fingerprint via sensors 120, and behavioral fingerprint library 170.

In some implementations, operation 504 may include an operation 505 for storing the sensed one or more actions of the authorized user as further depicted in FIG. 5a. For instance, memory 114, including library of behavioral fingerprints 170 of the computing device 10 of FIG. 1 storing one or more actions sensed by sensors 120 and actions over a network, such as social network interactions.

In the same or different implementations, operation 505 may include an operation 506 for detecting the one or more actions of the authorized user wherein the one or more actions of the authorized user include logging into one or more social networks. For instance, the level of authentication module 102/102a of the computing device 10 of FIG. 1 determining that first user 20 is operating computing device 10 as an authorized user and communication application 166 running a social network application with data being stored in behavioral fingerprint library 170.

In the same or alternative implementations, operation 503 may include an operation 507 for detecting one or more keystrokes on the computing device to determine a pattern of use associated with the authorized user. For instance, the level of authentication module 102/102a of the computing device 10 of FIG. 1 detecting via movement sensors 202 one or more keystrokes on computing device 10 to determine a pattern of use associated with an authorized user.

Operations 503 may also include an operation 508 for detecting one or more manners for swiping input on the computing device to determine a pattern of use associated with the authorized user as depicted in FIG. 5a. For instance, the level of authentication module 102/102a of the computing device 10 of FIG. 1 detecting via movement sensors 202 manners of swiping an input on computing device 10 to determine a pattern of use associated with an authorized user.

Operations 503 may also include an operation 509 for detecting one or more contacts frequently visited by the authorized user on the computing device to determine a visitation pattern associated with the authorized user as depicted in FIG. 5a. For instance, level of authentication module 102/102a of the computing device 10 of FIG. 1 detecting via social network library 302 a visitation pattern associated with an authorized user.

In some cases, operation 503 may, in turn, include an operation 510, which provides for comparing a stored image of the authorized user to a detected image of the first user via a camera connected to the computing device. For instance, computing device 10 using behavioral fingerprint library 170, authorized user library 304 to store an image of an authorized user, and level of authentication module 102/102a and/or behavior fingerprint module 106/106a comparing the stored image of the authorized user with a received image of first user 20 via sensors 120, such as image capturing device 204.

Referring to operation 504, operation 504 can include operation 511 altering the level of authentication of the first user as a function of the statistical predictability of the one or more future actions of the authorized user. For instance, computing device 10 altering a level of authentication using level of authentication module 102/102a as a function of a statistical probability determined via statistical level determination module 218 to determine one or more future actions of the authorize user.

In the same or different implementations, operation 511 may include an operation 512 for lowering the level of authentication of the first user when the one or more actions of the first user includes a detected anomalous action as further depicted in FIG. 5a. For instance, the anomalous action detecting module 212 of the computing device 10 detecting an anomalous action with respect to computing device 10 during use of the computing device 10 by the first user 20, and causing level of authentication module 102/102a to lower the level of authentication with respect to first user 20.

In various implementations, the operation 512 for lowering the level of authentication of the first user when the one or more actions of the first user includes a detected anomalous action may include operation 513 for detecting that the first user has performed an action uncharacteristic of the authorized user and/or that the first user has performed an action previously identified by the authorized user as being an action to cause lowering of the level of authentication. For instance, computing device 10, behavioral fingerprint library 170, anomalous activity library 306 alerting level of authentication module 102/102a and behavioral fingerprint library 106/106a of an action anomalous to a stored activity of anomalous activity library 306.

Operation 511 can further include operation 514 alerting a predetermined set of contacts if the statistical predictability of the one or more future actions of the authorized user causes a predetermined level of authentication of the first user. For instance, computing device 10 alerting a predetermined set of contacts via social network library 302 and network interface 112 after statistical level determination module 218 determines that the statistical predictability of one or more future actions of an authorized user causes a predetermined level of authentication of the first user 20. The predetermined level of authentication determined for first user 20 could be a determination that first user has stolen computing device 10, that first user 20 is on a list of users that are unauthorized, that first user 20 has entered several incorrect passwords or the like, which would cause a lowered level of authentication.

Operation 511 can further include operation 515 disabling one or more devices of the authorized user if the level of authentication is lowered to a predetermined level. For instance, computing device 10 disabling one or more devices for which computing device 10 has control when a level of authentication determined by level of authentication module 102/102a is altered to a lower predetermined level. The one or more devices can be configured to be automatically disabled without interference by first user 20 or the authorized user.

Operation 511 can further include operation 516 disabling a mobile device of the authorized user if the level of authentication is lowered to a predetermined level. For instance, computing device 10 disabling a mobile device when a level of authentication determined by level of authentication module 102/102a is altered to a lower predetermined level. The mobile device can be configured to be automatically disabled without interference by first user 20 or the authorized user.

Referring now to FIG. 5b operation 404, determining a level of authentication associated with the first user via the computing device, the level of authentication at least partially based on a behavioral fingerprint, can include operation 517 determining the level of authentication of the first user at least partially via a reconstructed key formed via gathered data from at least one social network. For instance, computing device 10, behavioral fingerprint library 170, cryptographic library 308 receiving key data from at least one social network, such as social networks stored in social network library 302 to rebuild an asymmetric key pair, such as a public/private key pair, a Triple DES or AES type cryptographic key.

In some implementations, operation 517 may further include an operation 518 for generating a security certificate associated with the authorized user based on an encryption key. For instance, cryptographic library 308 of computing device 10 generating a security certificate associated with the authorized user based on an encryption key such as a triple DES, AES or an asymmetric key pair, such as a private/public key pair. In doing so, the computing device 10 may store either a private or a public portion of the public/private key pair, or a combination thereof.

In some embodiments operation 518 may be followed by an operation 519 altering the encryption key to enable distribution of one or more altered forms of the encryption key to enable rebuilding of the encryption key via the gathered data from the at least one social network. For instance, an encryption key based on a public/private key pair could have the private key altered such that portions of the encryption key can be distributed to users/members/friends on at least one social network such as social networks stored via social network library 302 and the portions can later be gathered from the users/members/friends of the social network.

In various embodiments, operation 517 for determining the level of authentication of the first user at least partially via a reconstructed key formed via gathered data from at least one social network includes operation 525 determining a private/public key pair including a private key and a public key. For instance, cryptographic library 308 determining a private/public key pair with a private key and a public key.

Operation 525 can be followed by operation 526 altering the private key to enable distribution of one or more components of the private key, each of the one or more components of the private key required for the regenerated key. For instance, an encryption key based on a public/private key pair could have the private key separated into components of the encryption key for distribution of the one or more components so that the one or more components, or a combination thereof are required for the regenerated key.

Operation 526 can be followed by operation 527 distributing the one or more components of the private key to one or more members of a trusted group. For instance, cryptographic library 308 distributing via network interface 112 one or more components of the private key to one or members of a trusted group, such as members of a group on one or more social networks stored on social network library 302.

In one implementation, operation 517 for determining the level of authentication of the first user at least partially via a reconstructed key formed via gathered data from at least one social network, can further include operation 528 determining the gathered data from the at least one social network via retrieving one or more components of the private key required for the regenerated key from one or more members of a trusted group via the at least one social network. For instance, cryptographic library 308 gathering data via network interface 112 one or more components of the private key from one or members of a trusted group, such as members of a group of at least one social network stored on social network library 302.

In one implementation, operation 517 can further include operation 529 requesting each of the one or more members of the trusted group for the one or more components of the private key, each of the one or more members having a level of authentication previously granted by the authorized user. For instance, computing device 10 requesting via network interface 112 each of one or more members of a trusted group holding one or more components of the private key generated by cryptographic library 308, and each of the one or more members stored in social network library 302, having a level of authentication previously granted by authorized user and stored in social network library 302.

In one embodiment, operation 517 can further include operation 530 determining one or more members of a trusted group from which to gather the gathered data, the one or more members of the trusted group belonging to the at least one social network, each of the one or more members capable of storing a component to enable forming the reconstructed key. For instance, computing device 10 determining one or more members of a trusted group via social network library 302, each of the one or more members being a member of a social network, and each of the one or more members capable of storing a component of a cryptographic key created via cryptographic library 308 such that the component can be gathered as gathered data to reconstruct the cryptographic key via cryptographic library 308.

As further illustrated in FIG. 5c, in some implementations, operation 404 may further include an operation 531 for restricting access via the computing device to one or more applications in response to the determining as depicted in FIG. 5c. For instance, the access restriction module 104/104a of the computing device 10 restricting access via the computing device 10 to one or more items (e.g., electronic documents including electronic messages and/or productivity documents such as word processing documents, image or audio files, applications, passwords, and so forth) in response to the determining by at least restricting access to the one or more items that were accessible by an authorized user (e.g., was visible, editable, and/or usable by the authorized user) when the authorized user was using the computing device 10. For instance, the application access restriction module 264 (see FIG. 2c) of the computing device 10 restricting access via the computing device 10 to one or more applications 160 (e.g., a productivity application such as a word processing application, a communication application such as an IM application, a gaming application, and so forth) in response to the determining. In some cases, such restrictions to one or more applications 160 may be related to restricting use of one or more functionalities of the one or more applications 160. In some embodiments, access can be complete, for instance, the access restricting module 104/104a including the no access module 234 (see FIG. 2c) of the computing device 10 restricting access to the one or more items that would be accessible by the first user 20 when the first user 20 is an authorized user of computing device 10 by having the no access module 234 provide no access (e.g., completely hiding or erasing any indications of the existence of the one or more items) to the one or more items that were accessible by an authorized user was using the computing device 10.

As further illustrated in FIG. 5c, operation 531 may include one or more additional operations in various alternative implementations. For example, in some implementations, operation 531 may include an operation 532 for restricting access via the computing device to one or more productivity applications in response to the determining. For instance, the access restricting module 104/104a including the document access restricting module 254 (see FIG. 2c) of the computing device 10 restricting access to the one or more items that would be accessible by the first user 20 if first user 20 is determined to be an authorized user of the computing device 10 by having the productivity document access restricting module 255 provide restricted access (e.g., read-only access or limited functional access if the one or more items includes one or more applications 160) to the one or more items that were accessible by an authorized user using the computing device 10.

In some implementations, operation 532 may include an operation 533 for restricting access via the computing device to one or more communication applications in response to the determining. For instance, the communication application access restriction module 266 (see FIG. 2c) of the computing device 10 restricting access via the computing device 10 to one or more communication applications (e.g., email application, instant messaging or IM application, text messaging application, and so forth) in response to the determining.

In some cases, the access restricting operation 531 restricting access via the computing device to one or more applications in response to the determining may include an operation 534 for restricting access via the computing device to one or more personal information manager applications in response to the determining. For instance, the personal information manager application access restriction module 267 (see FIG. 2c) of the computing device 10 restricting access via the computing device 10 to one or more personal information manager applications (e.g., Microsoft® Outlook™) in response to the determining.

As further illustrated in FIG. 5c, operation 531 may include operation 535 restricting access via the computing device to automatic tasks that are associated with a predetermined level of authentication of an authorized user in response to the determining. For instance, the no automatic task functionality module 235 (see FIG. 2c) of the computing device 10 preventing, via the computing device 10 and in response at least in part to the determining a level of authentication, the one or more automatic tasks (e.g., door opening, car starting) can be prevented from being performed.

Figure 6:
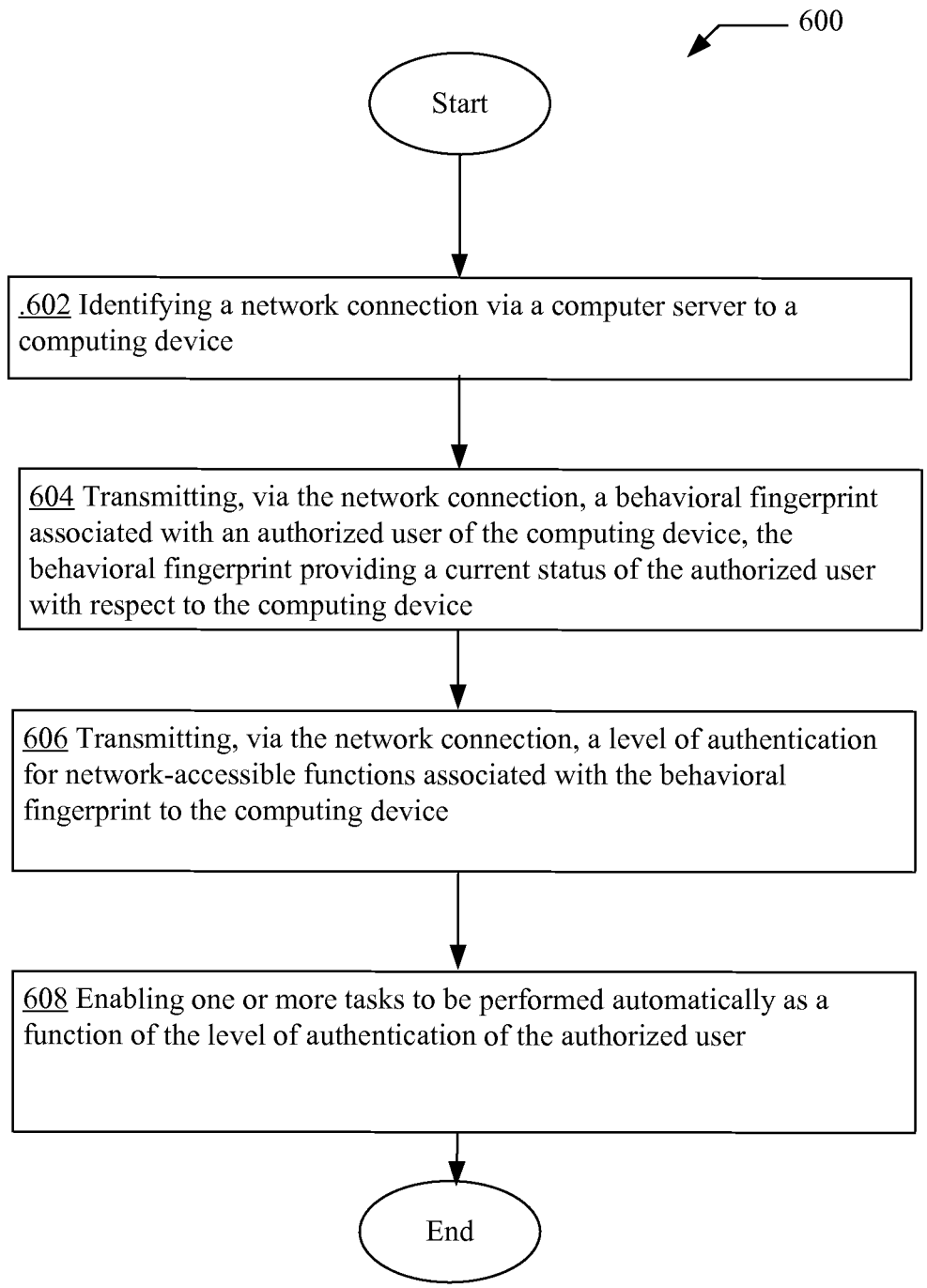
FIG. 6 is a high-level logic flowchart of a process depicting alternate implementations of network level operations.

A more detailed discussion related to the computer server 30 of FIGS. 1-3 will now be provided with respect to the processes and operations to be described herein. Referring now to FIG. 6, a detailed discussion related to the computing device 10 of FIGS. 1-3 will now be provided with respect to alternative processes and operations to be described herein. FIG. 6 illustrates an operational flow 600 representing example operations for, among other things, developing a behavioral fingerprint. In FIG. 6 and in the following figures that include various examples of operational flows, discussions and explanations will be provided with respect to the exemplary environment 100 described above and as illustrated in FIG. 1 and/or with respect to other examples (e.g., as provided in FIG. 2a) and contexts. However, it should be understood that the operational flows may be executed in a number of other environments and contexts, and/or in modified versions of FIGS. 2a, 2b, 2c, 2d, and FIGS. 3a and 3b. Also, although the various operational flows are presented in the sequence(s) illustrated, it should be understood that the various operations may be performed in other orders other than those which are illustrated, or may be performed concurrently.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6 as well as the other operations to be described herein are performed by at least one of a machine, an article of manufacture, or a composition of matter unless indicated otherwise.

In any event, after a start operation, the operational flow 600 of FIG. 6 includes an identification operation 602 for identifying a network connection via a computer server to a computing device. For instance, and as an illustration, the computer server 30 connecting via network 50 to the computing device 10 of FIG. 1. In addition to the identification operation 602, operational flow 600 may also include an operation 604 for transmitting, via the network connection, a behavioral fingerprint associated with an authorized user of the computing device, the behavioral fingerprint providing a current status of the authorized user with respect to the computing device as further illustrated in FIG. 6. For instance, transmitting via network interface 112c determining a level of authentication for first user 20. The level of authentication can be configured to restrict access to the one or more items/actions as a function of the level of authentication assigned to first user 20. If first user 20 is identified as an authorized user, level of authentication module 102/102a can be configured to take into account a behavioral fingerprint associated with that authorized user. FIG. 6 further shows operation 606 for transmitting, via the network connection, a level of authentication for network-accessible functions associated with the behavioral fingerprint to the computing device. For instance, computer server 30 transmitting via network interface 112c a level of authentication for any network-accessible functions shown in FIG. 2e associated with a behavioral fingerprint of computing device 20. FIG. 6 further shows operation 608 for enabling one or more tasks to be performed automatically as a function of the level of authentication of the authorized user. For instance, computer server 30 enabling tasks associated with functions shown in FIG. 2e, such as communication applications 166c and productivity applications 164c to be performed automatically.

Figure 7A:
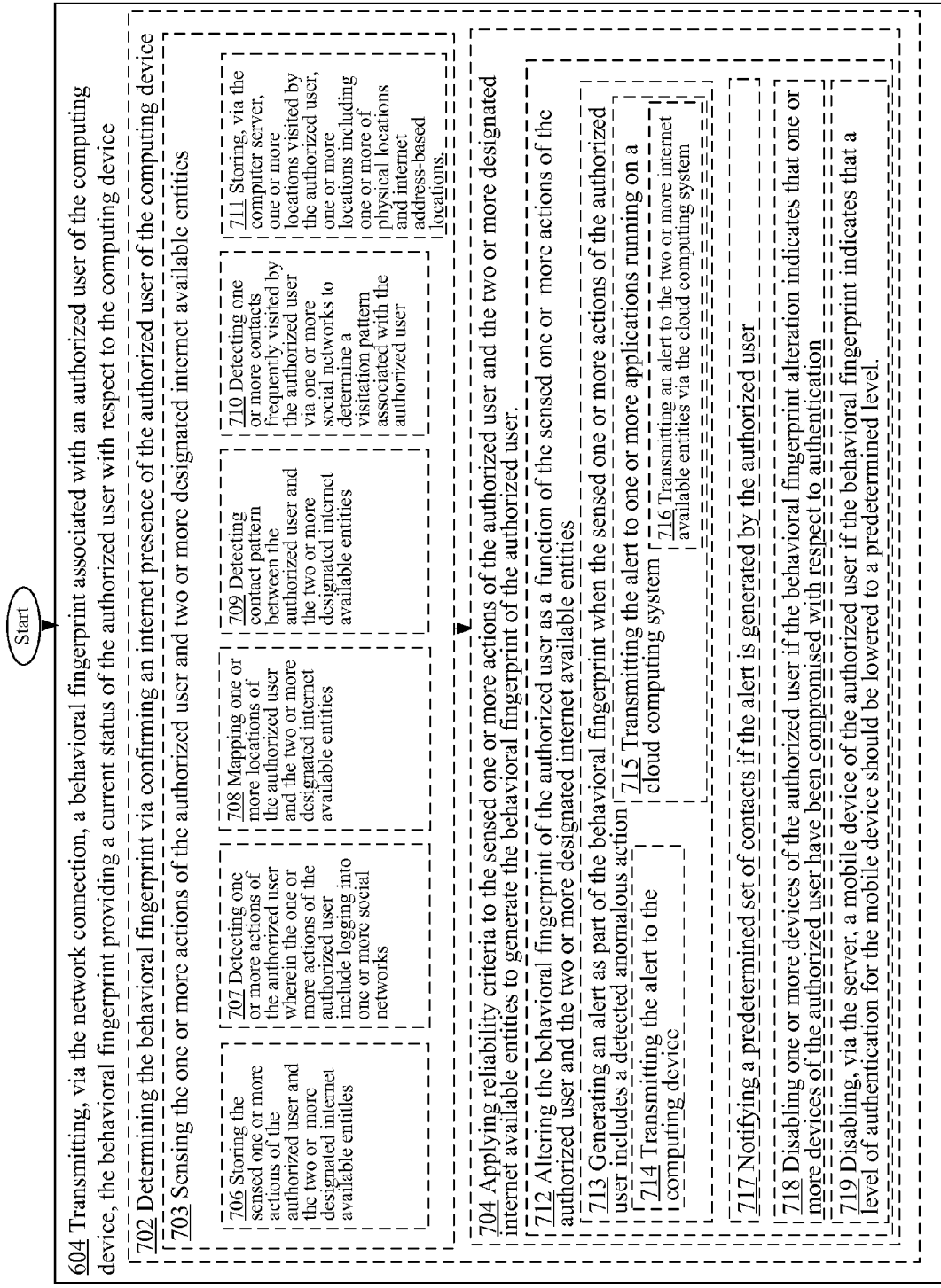
FIG. 7a is a high-level logic flowchart of a process depicting alternate implementations of the computer server operation 604 of FIG. 6.
Figure 7B:
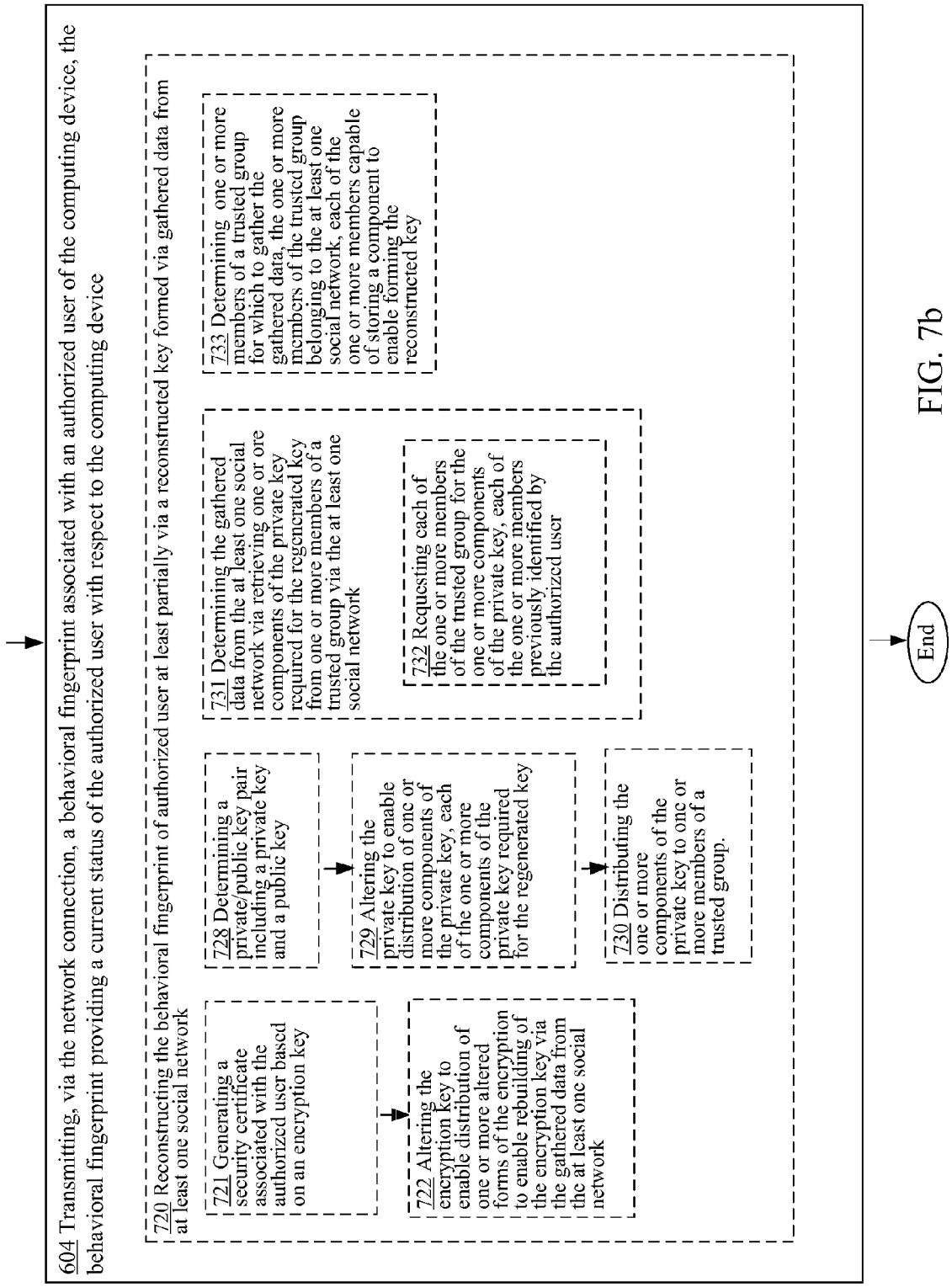
FIG. 7b is a high-level logic flowchart of a process depicting alternate implementations of the computer server operation 804 of FIG. 8.

As will be further described herein, the behavioral fingerprint operation 604 of FIG. 6 may be executed in a variety of different ways in various alternative implementations. FIGS. 7a and 7b for example, illustrate at least some of the alternative ways that operation 604 of FIG. 6 may be executed in various alternative implementations. For example, in various implementations, operation 604 of FIG. 6 may include an operation 702 for determining the behavioral fingerprint via confirming an internet presence of the authorized user of the computing device as depicted in FIG. 7a. For instance, behavioral fingerprint module 106/106a/106c determining a behavioral fingerprint of first user 20 by establishing that first user 20 is an authorized user of computing device 10, and generating a behavioral fingerprint via fingerprint build/degradation module 314 and fingerprint generation module 316, which can include statistical calculations based on prior actions to predict future actions of an authorized user.

As further illustrated in FIG. 7a, in some implementations, the behavioral fingerprint operation 702 may additionally or alternatively include an operation 703 for sensing one or more actions of the authorized user and two or more designated internet available entities. For instance, sensors 120 and level of authentication module 102/102a of the computing device 10 of FIG. 1 determining that first user 20 is an authorized user based, at least in part, on data provided by one or more sensors 120 and sensing activities of two or more designated internet available entities, such as via a cloud computing network, network 50, and/or device 60 shown in FIG. 1.

Data from various types of sensors 120 may be used in order to determine a behavioral fingerprint to be stored on computer server 30 and computing device 10. For example, and as further illustrated in FIG. 7a, operation 703 may be followed by an operation 704 applying reliability criteria to the sensed one or more actions of the authorized user and the two or more designated internet available entities to generate the behavioral fingerprint of the authorized user. For instance, the actions of the authorized user and two or more designated internet available entities can be judged via statistical probabilities or other criteria to determine if the actions are consistent with available data and used to generate or to regenerate or amend a behavioral fingerprint of the authorized user.

In some implementations, operation 703 may include an operation 706 for storing the sensed one or more actions of the authorized user and the two or more designated internet available entities as further depicted in FIG. 7a. For instance, memory 114/114c, including library of behavioral fingerprints 170/170c in computing device 10/computer server 30 of FIG. 1, including storing one or more actions sensed by sensors 120 and actions over a network, such as social network interactions.

In some implementations, operation 703 may include an operation 707 for detecting the one or more actions of the authorized user wherein the one or more actions of the authorized user include logging into one or more social networks as further depicted in FIG. 7a. For instance, memory 114c, including library of behavioral fingerprints 170c of the computer server 30 of FIG. 1 detecting one or more actions over a network, such as social network interactions. Also, detecting one or more actions can include an authorized user and communication application 166c running a social network application with data being stored in behavioral fingerprint library 170c.

In the same or different implementations, operation 703 may include an operation 708 for mapping one or more locations of the authorized user and the two or more designated internet available entities. For instance, the level of authentication module 102/102a/102c of the computing device 10/computer server 30 of FIG. 1 determining that first user 20 is operating computing device 10 via a network connection and using GPS-enabled applications, such as GPS 208 shown on FIG. 2d of computing device 10 to locate the authorized user. Additionally, any designated internet available entities can be located via social network functionalities such as a "check in" function on a smart phone application running on devices 60 or the like.

In the same or alternative implementations, operation 703 may include an operation 709 for detecting contact pattern between the authorized user and the two or more designated internet available entities. For instance, the applications 160c applications running on a computer server/cloud computer servers 30 of FIG. 1 detecting how often an authorized user of computing device 10 contacts other internet available entities and devices 60 to determine a pattern of use associated with an authorized user.

Operations 703 may also include an operation 710 for detecting one or more contacts frequently visited by the authorized user via one or more social networks to determine a visitation pattern associated with the authorized user as depicted in FIG. 7a. For instance, the level of authentication module 102/102a/102c of the computing device 10 and computer server 30 of FIG. 1 detecting contacts frequently visited via Facebook™ and/or Twitter™ and social network library 302 by an authorized user of device 10 to determine a pattern of visitation or frequently contacted persons associated with an authorized user.

Operations 703 may also include an operation 711 for storing, via the computer sever, one or more locations visited by the authorized user, the one or more locations including one or more of physical locations and internet address-based locations as depicted in FIG. 7a. For instance, level of authentication module 102/102a/102c of the computing device 10 and computer server 30 of FIG. 1 via social network library 302 and GPS enabled applications 308 and the like any physical locations and/or internet address-based locations visited by and/or associated with an authorized user.

Referring to operation 704, operation 704 can include operation 712 altering the behavioral fingerprint of the authorized user as a function of the sensed one or more actions of the authorized user and the two or more designated internet available entities. For instance, computer server 30 and/or computing device 10 altering a level of authentication using level of authentication module 102/102a/102c as a function of the sensed one or more actions of the authorized user and the two or more designated internet available entities.

In the same or different implementations, operation 712 may include an operation 713 for generating an alert as part of the behavioral fingerprint when the sensed one or more actions of the authorized user includes a detected anomalous action as further depicted in FIG. 7a. For instance, alert generating module 108c interacting with the anomalous action detecting module 212 of the computing device 10 and/or computer server 30 detecting an anomalous action with respect to computing device 10 or with respect to sensed one or more actions of an authorized user of computing device 10 during use of the computing device 10 or by using another computing device. For example, an authorized user can borrow or use a public computer to send an alert or create an anomalous action which indicates that any actions by the first user 20, could cause level of authentication module 102/102a to lower the level of authentication with respect to first user 20.

In various implementations, the operation 713 for generating an alert may include operation 714 for transmitting the alert to the computing device. For instance, computer server 30 sending to computing device 10 via network interface 112c an alert to behavioral fingerprint library 170, anomalous activity library 306 alerting level of authentication module 102/102a and behavioral fingerprint library 106/106a of an action anomalous to a stored activity of anomalous activity library 306.

In various implementations, the operation 713 for generating an alert may include operation 715 for transmitting the alert to one or more applications running on a cloud computing system. For instance computer server 30 operating in a cloud computing environment receiving the alert via network interface 112c.

In various implementations, operation 715 may include operation 716 for transmitting an alert to the two or more internet available entities via the cloud computing system. For instance, alerting a predetermined set of contacts via computer server 30 operating in a cloud environment if the statistical predictability of the one or more future actions of the authorized user causes an alert. For instance, computing device 10 or computer server 30 alerting a predetermined set of contacts via social network library 302 and network interface 112/112c after statistical level determination module 218 determines that the statistical predictability of one or more future actions of an authorized user detects an anomaly.

Operation 712 can further include operation 717 for notifying a predetermined set of contacts if the alert is generated by the authorized user. For instance, computer server 30 notifying one or more devices 60 when alert is generated by an authorized user. The one or more devices can be configured to be automatically notified without interference by first user 20 or the authorized user.

Operation 712 can further include operation 718 for disabling one or more devices of the authorized user if the behavioral fingerprint alteration indicates that the one or more devices of the authorized user have been compromised with respect to authentication. For instance, computing device 10 disabling a mobile device when a behavioral fingerprint determined via library of behavioral fingerprints 170 and behavioral fingerprint module 106/106a is altered to an untrustworthy level. The devices 60 can be configured to be automatically disabled without interference by first user 20 or the authorized user.

Operation 712 can further include operation 719 for disabling, via the server, a mobile device of the authorized user if the behavioral fingerprint indicates that a level of authentication for the mobile device should be lowered to a predetermined level. For instance, computer server 30 disabling a mobile device or any device 60 when a behavioral fingerprint determined via library of behavioral fingerprints 170c and behavioral fingerprint module 106c is altered to an untrustworthy level. The mobile device can be configured to be automatically disabled without interference by first user 20 or the authorized user.

Referring now to FIG. 7b operation 604 transmitting, via the network connection, a behavioral fingerprint associated with an authorized user of the computing device, the behavioral fingerprint providing a current status of the authorized user with respect to the computing device, can include operation 720 reconstructing the behavioral fingerprint of authorized user at least partially via a reconstructed key at least partially formed via data gathered from at least one social network. For instance, computer server 30 using behavioral fingerprint library 170c, and cryptographic library 308 receiving key data from at least one social network, such as social networks stored in social network library 302 to rebuild a public/private key pair, a Triple DES or AES type cryptographic key.

In some implementations, operation 720 may further include an operation 721 for generating a security certificate associated with the authorized user based on an encryption key. For instance, cryptographic library 308 of computing device 10 generating a security certificate associated with the authorized user based on an encryption key such as a triple DES, AES or an asymmetrical key pair such as a private/public key pair. In doing so, the computer server 30 may store a private portion of the public/private key pair.

In some embodiments operation 721 may be followed by an operation 722 altering the encryption key to enable distribution of one or more altered forms of the encryption key to enable rebuilding of the encryption key via the gathered data from the at least one social network. For instance, within computer server 30, an encryption key based on a public/private key pair could have the private key altered such that portions of the encryption key can be distributed to users/members/friends on at least one social network such as social networks stored via social network library 302 and the portions can later be gathered from the users/members/friends of the social network.

In various embodiments, operation 720 includes operation 728 for determining a private/public key pair including a private key and a public key. For instance, cryptographic library 308 determining a private/public key pair with a private key and a public key.

Operation 728 can be followed by operation 729 for altering the private key to enable distribution of one or more components of the private key, each of the one or more components of the private key required for the regenerated key. For instance, an encryption key based on a public/private key pair could have the private key separated into components of the encryption key for distribution of the one or more components so that the one or more components are required for the regenerated key.

Operation 729 can be followed by operation 730 distributing the one or more components of the private key to one or more members of a trusted group. For instance, cryptographic library 308 distributing via computer server 30 network interface 112c one or more components of the private key to one or members of a trusted group, such as members of a group on one or more social networks stored on social network library 302.

In one implementation, operation 720 for reconstructing the behavioral fingerprint of authorized user at least partially via a reconstructed key at least partially formed via data gathered from at least one social network, can further include operation 731 determining the gathered data from the at least one social network via retrieving one or more components of the private key required for the regenerated key from one or more members of a trusted group via the at least one social network. For instance, cryptographic library 308 gathering data via network interface 112c of computer server 30 one or more components of the private key from one or members of a trusted group, such as members of a group of at least one social network stored on social network library 302.

In one implementation, operation 731 can further include operation 732 for requesting each of the one or more members of the trusted group for the one or more components of the private key, each of the one or more members previously identified by the authorized user. For instance, computer server 30 requesting via network interface 112c each of one or members of a trusted group holding one or more components of the private key generated by cryptographic library 308, and each of the one or more members stored in social network library 302, having a level of authentication previously granted by authorized user and stored in social network library 302.

In one embodiment, operation 720 can further include operation 733 determining one or more members of a trusted group from which to gather the gathered data, the one or more members of the trusted group belonging to the at least one social network, each of the one or more members capable of storing a component to enable forming the reconstructed key. For instance, computer server 30 determining one or more members of a trusted group via social network library 302, each of the one or more members being a member of a social network, and each of the one or more member members capable of storing a component of a cryptographic key created via cryptographic library 308 such that the component can be gathered as gathered data to reconstruct the cryptographic key via cryptographic library 308.

Figure 8:
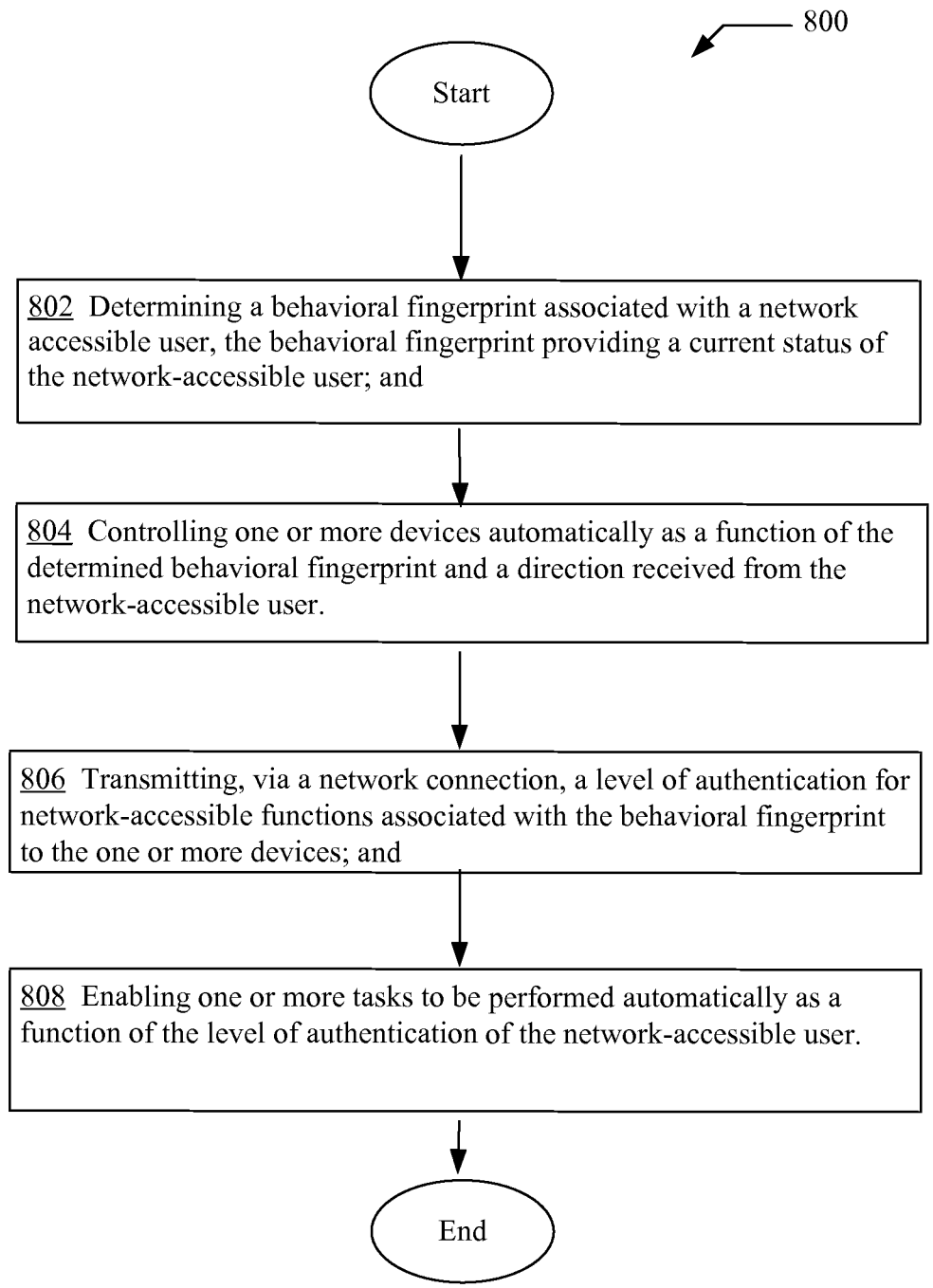
FIG. 8 is a high-level logic flowchart of a process depicting alternate implementations of network level operations.

A more detailed discussion related to the computer server 30 of FIGS. 1-3 will now be provided with respect to alternate processes and operations to be described herein. Referring now to FIG. 8, a detailed discussion related to the computing device 10 of FIGS. 1-3 will now be provided with respect to alternative processes and operations to be described herein. FIG. 8 illustrates an operational flow 800 representing example operations for, among other things, developing a behavioral fingerprint. In FIG. 8 and in the following figures that include various examples of operational flows, discussions and explanations will be provided with respect to the exemplary environment 100 described above and as illustrated in FIG. 1 and/or with respect to other examples (e.g., as provided in FIG. 2a) and contexts. However, it should be understood that the operational flows may be executed in a number of other environments and contexts, and/or in modified versions of FIGS. 2a, 2b, 2c, and 2d, and FIGS. 3a and 3b. Also, although the various operational flows are presented in the sequence(s) illustrated, it should be understood that the various operations may be performed in other orders other than those which are illustrated, or may be performed concurrently.

Further, in FIG. 8 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 8 as well as the other operations to be described herein are performed by at least one of a machine, an article of manufacture, or a composition of matter unless indicated otherwise.

In any event, after a start operation, the operational flow 800 of FIG. 8 includes an association operation 802 for determining a behavioral fingerprint associated with a network accessible user, the behavioral fingerprint providing a current status of the network-accessible user. For instance, and as an illustration, the computer server 30 connecting via network 50 to the computing device 10 of FIG. 1 can establish and/or determine a behavioral fingerprint associated with a network accessible user, which could be first user 20 of computing device 10 and the device or a network can provide a current status of the network-accessible user. In addition to the association operation 802, operational flow 800 may also include a controlling operation 804 for controlling one or more devices automatically as a function of the determined behavioral fingerprint and a direction received from the network-accessible user as further illustrated in FIG. 8. For instance, controlling via network interface 112c one or more devices such as computing device 10. The behavioral fingerprint and a direction from the network-accessible user can be configured to control devices as a function of the behavioral fingerprint of a network-accessible user. If first user 20 is identified as the network-accessible user, level of authentication module 102/102a can be configured to take into account a behavioral fingerprint associated with that user. FIG. 8 further shows operation 806 for transmitting, via a network connection, a level of authentication for network-accessible functions associated with the behavioral fingerprint to the one or more devices. For instance, computer server 30 transmitting via network interface 112c a level of authentication for any network-accessible functions shown in FIG. 2e associated with a behavioral fingerprint of a network-accessible user. FIG. 8 further shows operation 808 for enabling one or more tasks to be performed automatically as a function of the level of authentication of the network-accessible user. For instance, computer server 30 enabling tasks associated with functions shown in FIG. 2e, such as communication applications 166c and productivity applications 164c to be performed automatically.

Figure 9A:
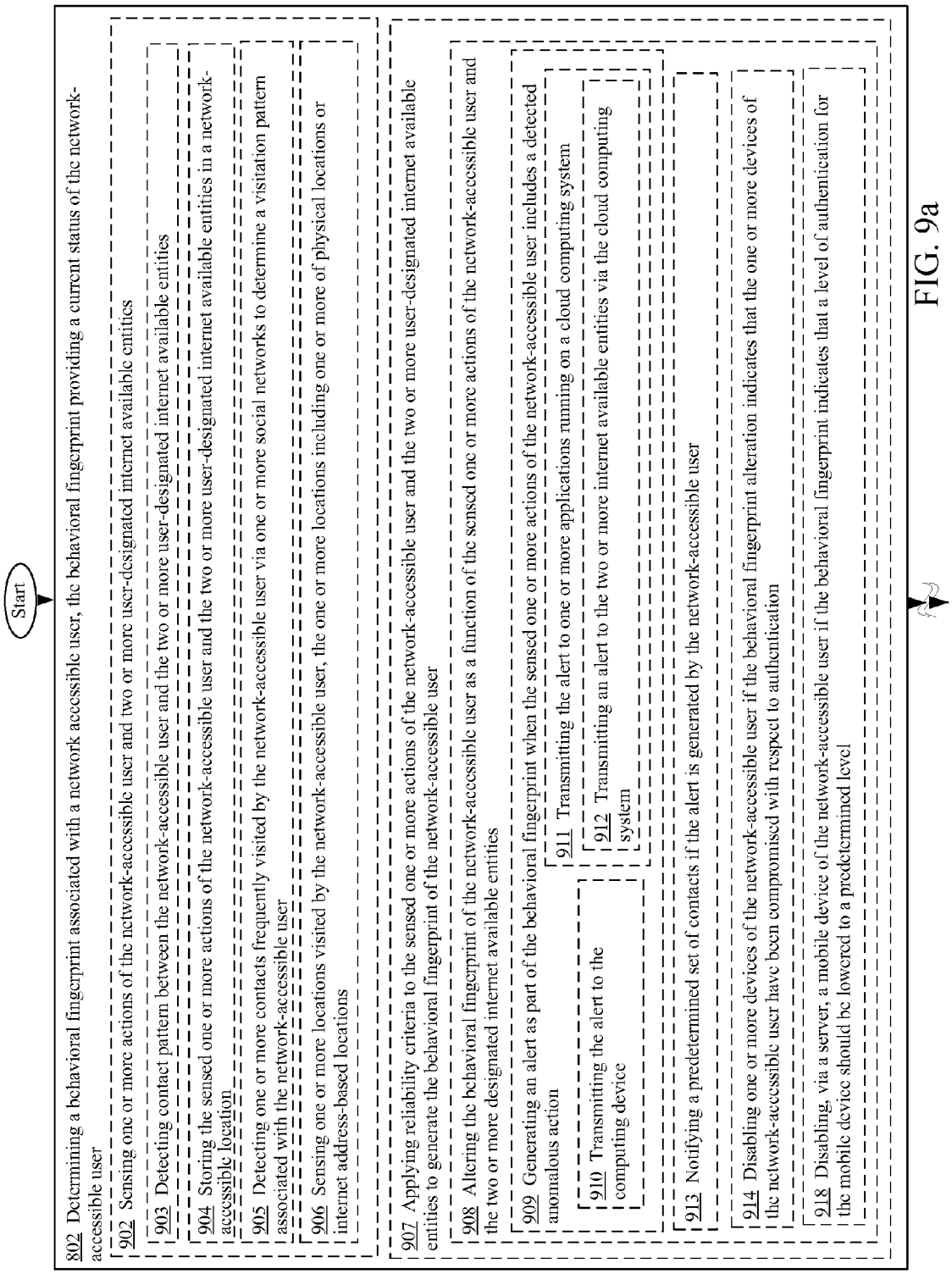
FIG. 9a is a high-level logic flowchart of a process depicting alternate implementations of the computer server operation 802 of FIG. 8.
Figure 9B:
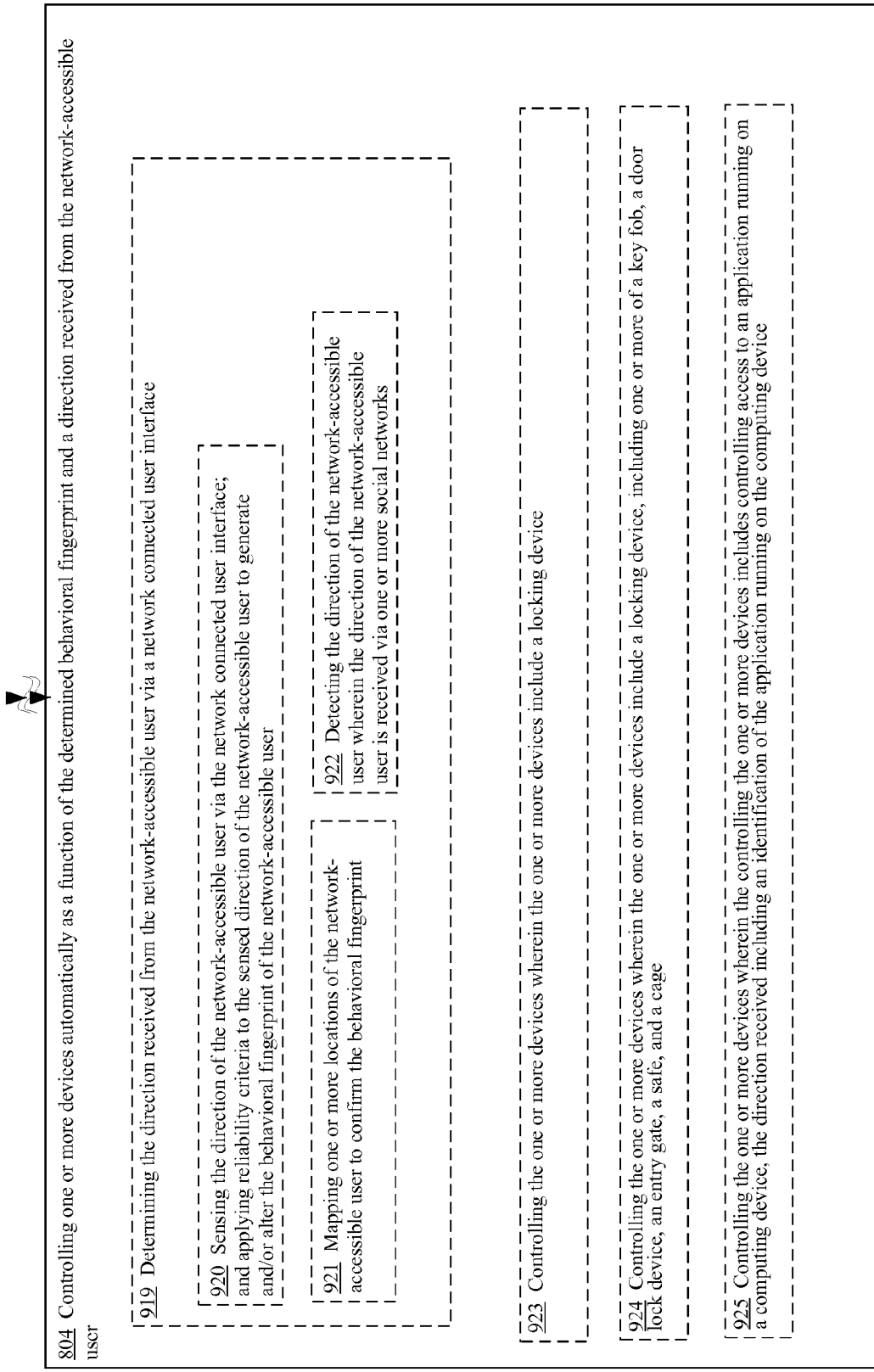
FIG. 9b is a high-level logic flowchart of a process depicting alternate implementations of the computer server operation 804 of FIG. 8.
Figure 9C:
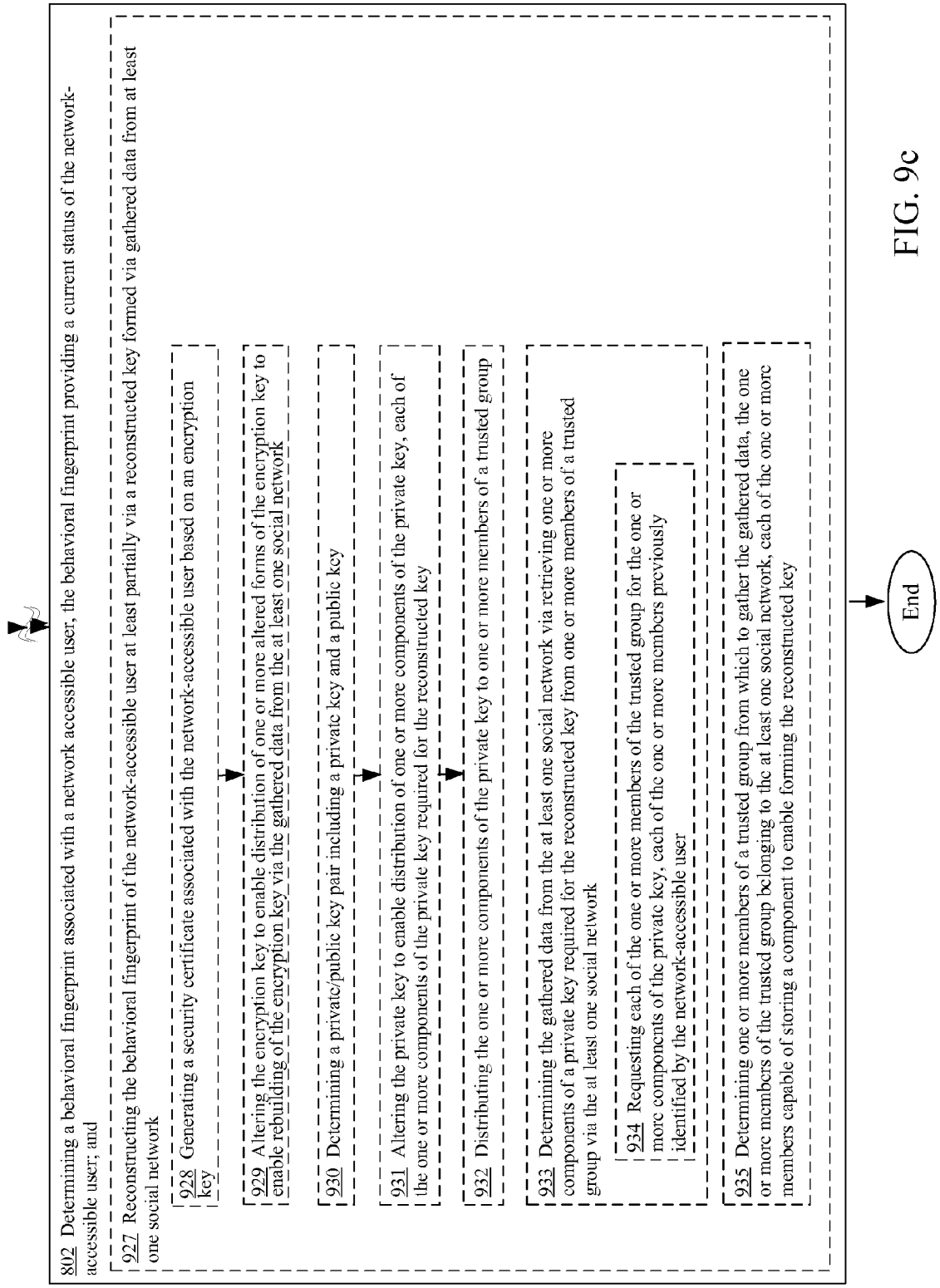
FIG. 9c is a high-level logic flowchart of a process depicting alternate implementations of the computer server operation 802 of FIG. 8.

As will be further described herein, the behavioral fingerprint operation 804 of FIG. 8 may be executed in a variety of different ways in various alternative implementations. FIGS. 9a, 9b, 9c, for example, illustrate at least some of the alternative ways that operation 802 or 804 of FIG. 8 may be executed in various alternative implementations. For example, in various implementations, operation 802 of FIG. 8 may include an operation 902 for sensing one or more actions of the network-accessible user and two or more user-designated internet available entities as depicted in FIG. 9a. For instance, behavioral fingerprint module 106/106a/106c determining a behavioral fingerprint of a network-accessible user by establishing that first user 20 is the network-accessible user and sensing one or more actions of the network accessible user via sensors 120 and level of authentication module 102/102a of the computing device 10 of FIG. 1. Data provided by one or more sensors 120 and sensing activities of two or more designated internet available entities, such as via a cloud computing network, network 50, and/or device 60 shown in FIG. 1. In various implementations, operation 802 of FIG. 8 may also include an operation 907 for applying reliability criteria to the sensed one or more actions of the network-accessible user and the two or more user-designated internet available entities to generate the behavioral fingerprint of the network-accessible user as depicted in FIG. 9a.

Operation 902 can include operation 903 for detecting contact pattern between the network-accessible user and the two or more user-designated internet available entities. For instance, detecting a contact between first user 20 and two or more user-designated internet available entities, such as entities available through network 50 to internet available entities 60.

Operation 902 can further include operation 904 for storing the sensed one or more actions of the network-accessible user and the two or more user-designated internet available entities in a network-accessible location. For instance, storing via either cloud servers 30 or computing device 10 the one or more actions of the network-accessible user and the two or more user-designated internet available entities in a network-accessible location. For example, servers 30 and/or computing device 10 can have memory 114 and 114c capable of storing the one or more actions.

Operation 902 can further include operation 905 for detecting one or more contacts frequently visited by the network-accessible user via one or more social networks to determine a visitation pattern associated with the network-accessible user. For instance, detecting via sensors disposed within computing device 10 and stored in memory 114 and/or 114c, and/or detecting contacts recorded via one or more social networks such as Facebook and Twitter or the like to establish a visitation pattern by first user 20 as network accessible user.

Operation 902 can further include operation 906 for sensing one or more locations visited by the network-accessible user, the one or more locations including one or more of physical locations or internet address-based locations. For instance, sensors 120 located in computing device 10 and/or software disposed in computing device 10 logging locations visited by first user 20, such as locations including physical locations and internet based locations entered on computing device 10.

Operation 907 can further include operation 908 for altering the behavioral fingerprint of the network-accessible user as a function of the sensed one or more actions of the network-accessible user and the two or more designated internet available entities. For instance, altering via behavioral fingerprint module 106a/106c as a function of the sensed one or more actions of first user 20 and the two more designated internet available entities 60.

Operation 908 can include operation 909 for generating an alert as part of the behavioral fingerprint when the sensed one or more actions of the network-accessible user includes a detected anomalous action. For instance, promulgating a network alert as part of the behavioral fingerprint module 106/106c functions when the sensors 120 sense one or more actions of first user 20 that include detected anomalous actions. For example a network-accessible user posing as an authorized user of computing device 10.

Operation 909 can include operation 910 for transmitting the alert to the computing device. For instance, in one embodiment, servers 30, and behavioral fingerprint module 160c transmitting an alert over a network to computing device 10 or to internet available entities 60.

Operation 910 can be followed by operation 911 for transmitting the alert to one or more applications running on a cloud computing system. For instance, servers 30 as cloud servers 30, and behavioral fingerprint module 160c transmitting an alert over a cloud network of servers 30 to computing device 10 or to internet available entities 60.

Operation 911 can include operation 912 for transmitting an alert to the two or more internet available entities via the cloud computing system. For instance, servers 30 as cloud servers 30, and behavioral fingerprint module 160c transmitting an alert over a cloud network of servers 30 to internet available entities 60.

Operation 908 can further include operation 913 for notifying a predetermined set of contacts if the alert is generated by the network-accessible user. For instance, memory 114/114c can include a set of contacts that can be contacted if an alert is to be promulgated over network 50 by first user 20 as a network accessible user.

Operation 908 can further include operation 914 for disabling one or more devices of the network-accessible user if the behavioral fingerprint alteration indicates that the one or more devices of the network-accessible user have been compromised with respect to authentication. For instance, alert generating module 108/108c generating a disabling signal capable of disabling one or more devices, such as computing device 10 if an alterations via behavioral fingerprint modules 106/106c indicate that a computing device has been compromised. For example, an alteration that indicates that a network accessible user is performing anomalous actions such as emptying bank accounts or other actions predetermined to be anomalous or logged as being highly unlike an expected action by a user associated with the behavioral fingerprint, a disabling signal can be generated.

Operation 908 can further include operation 918 for disabling, via a server, a mobile device of the network-accessible user if the behavioral fingerprint indicates that a level of authentication for the mobile device should be lowered to a predetermined level. For instance, disabling signal capable of disabling one or more devices, such as computing device 10 if an alteration via behavioral fingerprint module 106/106c indicates that a computing device has been compromised.

Referring now to FIG. 9b, operations continue with operation 804 which provides for controlling one or more devices automatically as a function of the determined behavioral fingerprint and a direction received from the network-accessible user. Disposed within operation 804 is operation 919 for determining the direction received from the network-accessible user via a network connected user interface. For instance, determining via one of computing device 10 or server 30 a received direction from a network accessible user, over a network connected user interface such as first user 20 or the like, via an input/output such as user interface 110 or network interface 112c on server 30 over network 50.

Disposed within operation 919 is operation 920 for sensing the direction of the network-accessible user via the network connected user interface or for applying reliability criteria to the sensed direction of the network-accessible user to generate and/or alter the behavioral fingerprint of the network-accessible user. For instance, sensing via sensors 120, or the like, a direction from first user 20 over user interface 110.

Also disposed within operation 919 is operation 921 for mapping one or more locations of the network-accessible user to confirm the behavioral fingerprint. For instance, mapping via GPS module 280 shown in FIG. 2b a location of first user 20 or another network accessible user to confirm a behavioral fingerprint such as a behavioral fingerprint created via module 106/106a/106c. Also disposed within operation 919 is operation 922 for detecting the direction of the network-accessible user wherein the direction of the network-accessible user is received via one or more social networks.

Following operation 919 is operation 923 for controlling the one or more devices wherein the one or more devices include a locking device. For instance, responsive to a direction received from a network accessible user, controlling one or more devices having a locking device, such as locking devices 70 shown in FIG. 1. The controlling can be via network interface 112c or one or more devices such as computing device 10. The behavioral fingerprint and a direction from the network-accessible user can be configured to control devices as a function of the behavioral fingerprint of a network-accessible user. If first user 20 is identified as the network-accessible user, level of authentication module 102/102a can be configured to take into account a behavioral fingerprint associated with that user.

Following operation 923 is operation 924 for controlling the one or more devices wherein the one or more devices include a locking device, including one or more of a key fob, a door lock device, an entry gate, a safe, and a cage. For instance, responsive to a direction received from a network accessible user, controlling one or more devices with a locking device, such as locking devices 70 shown in FIG. 1. including gate 71, safe 72, cage 73, key fob 74 and car 75.

Following operation 924 is operation 925 for controlling the one or more devices wherein the controlling the one or more devices includes controlling access to an application running on a computing device, the direction received including an identification of the application running on the computing device. For instance, controlling access to computer device 10 via access restricting module 104/104a to control access to productivity applications 164 or the like.

Referring now to FIG. 9C, operation 802 continues with operation 927 for reconstructing the behavioral fingerprint of network-accessible user at least partially via a reconstructed key formed via gathered data from at least one social network. For instance, computer server 30 using behavioral fingerprint library 170c, and cryptographic library 308 receiving key data from at least one social network, such as social networks stored in social network library 302 to rebuild a public/private key pair, a Triple DES or AES type cryptographic key.

In some implementations, operation 927 may further include an operation 928 for generating a security certificate associated with the network-accessible user based on an encryption key. For instance, cryptographic library 308 of computing device 10 generating a security certificate associated with the authorized user based on an encryption key such as a triple DES, AES or private/public key pair. In doing so, the computer server 30 may store either a private or a public portion of the public/private key pair.

In some embodiments operation 928 may be followed by an operation 929 altering the encryption key to enable distribution of one or more altered forms of the encryption key to enable rebuilding of the encryption key via the gathered data from the at least one social network. For instance, within computer server 30, an encryption key based on a public/private key pair could have a e.g. private key altered such that portions of the encryption key can be distributed to users/members/friends on at least one social network such as social networks stored via social network library 302 and the portions can later be gathered from the users/members/friends of the social network.

In various embodiments, operation 927 includes operation 930 for determining a private/public key pair including a private key and a public key. For instance, cryptographic library 308 determining a private/public key pair with a private key and a public key.

In one implementation, operation 927 can include operation 931 for altering the private key to enable distribution of one or more components of the private key, each of the one or more components of the private key required for the reconstructed key. For instance, an encryption key based on a public/private key pair could have the private key separated into components of the encryption key for distribution of the one or more components so that the one or more components are required for the reconstructed key.

Operation 931 can be followed by operation 932 for distributing the one or more components of the private key to one or more members of a trusted group. For instance, cryptographic library 308 distributing via computer server 30 network interface 112c one or more components of the private key to one or members of a trusted group, such as members of a group on one or more social networks stored on social network library 302.

In some implementations, operation 932 can be followed by operation 933 for determining the gathered data from the at least one social network via retrieving one or more components of a private key required for the reconstructed key from one or more members of a trusted group via the at least one social network. For instance, cryptographic library 308 gathering data via network interface 112c of computer server 30 one or more components of the private key from one or members of a trusted group, such as members of a group of at least one social network stored on social network library 302.

In one implementation, operation 933 can further include operation 934 for requesting each of the one or more members of the trusted group for the one or more components of the private key, each of the one or more members previously identified by the network-accessible user. For instance, computer server 30 requesting via network interface 112c each of one or more members of a trusted group holding one or more components of the private key generated by cryptographic library 308, and each of the one or more members stored in social network library 302, having a level of authentication previously granted by authorized user and stored in social network library 302.

In one embodiment, operation 927 can further include operation 935 for determining one or more members of a trusted group from which to gather the gathered data, the one or more members of the trusted group belonging to the at least one social network, each of the one or more members capable of storing a component to enable forming the reconstructed key. For instance, computer server 30 determining one or more members of a trusted group via social network library 302, each of the one or more members being a member of a social network, and each of the one or more members capable of storing a component of a cryptographic key created via cryptographic library 308 such that the component can be gathered as gathered data to reconstruct the cryptographic key via cryptographic library 308.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, one or more instructions forming a general purpose computing device configured by a computer program (e.g., a general purpose computer configured by a computer program which at least partially carries out processes and/or devices described herein, or a microprocessor configured by a computer program which at least partially carries out processes and/or devices described herein), one or more instructions forming a memory device (e.g., forms of random access memory), and/or one or more instructions forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/ communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system, comprising:
   at least one hardware computing device; and
   one or more instructions which when executed on the at least one hardware computing device cause the at least one hardware computing device to at least:
      maintain at least one behavioral fingerprint, the at least one behavioral fingerprint associated with the at least one hardware computing device and at least one authorized user of the at least one hardware computing device;
      detect, at least partially based on at least one comparative analysis, at least one indication that the at least one hardware computing device is not under control of the at least one authorized user, the at least one comparative analysis including at least comparing at least a portion of at least one image associated with the at least one behavioral fingerprint to at least a portion of at least one image captured by at least one image sensor of the at least one hardware computing device;
      control at least one security-related aspect of the at least one hardware computing device at least partially based on at least one direction received from the at least one authorized user; and
      enable one or more automatic tasks, including at least transmitting one or more alerts indicative of one or more of the at least one authorized user or the at least one hardware computing device.

2. A system, comprising:
   circuitry for maintaining at least one behavioral fingerprint, the at least one behavioral fingerprint associated with at least one computing device and at least one authorized user of the at least one computing device;
   circuitry for detecting, at least partially based on at least one comparative analysis, at least one indication that the at least one computing device is not under control of the at least one authorized user, the at least one comparative analysis including at least comparing at least a portion of at least one image associated with the at least one behavioral fingerprint to at least a portion of at least one image captured by at least one image sensor of the at least one computing device;
   circuitry for controlling at least one security-related aspect of the at least one computing device at least partially based on at least one direction received from the at least one authorized user; and
   circuitry for enabling one or more automatic tasks, including at least transmitting one or more alerts indicative of one or more of the at least one authorized user or the at least one computing device.

3. The system of claim 2, wherein circuitry for enabling one or more automatic tasks, including at least transmitting one or more alerts indicative of one or more of the at least one authorized user or the at least one computing device comprises:
   circuitry for transmitting at least one alert associated with notifying the at least one authorized user of the detecting at least one indication that the at least one computing device is not under control of the at least one authorized user.

4. The system of claim 2, wherein circuitry for enabling one or more automatic tasks, including at least transmitting one or more alerts indicative of one or more of the at least one authorized user or the at least one computing device comprises:
   circuitry for transmitting at least one alert to at least one application running on the at least one computing device.

5. The system of claim 2, wherein circuitry for enabling one or more automatic tasks, including at least transmitting one or more alerts indicative of one or more of the at least one authorized user or the at least one computing device comprises:
   circuitry for transmitting at least one signal to alert at least one task available to be performed by the at least one computing device.

6. The system of claim 2, wherein circuitry for enabling one or more automatic tasks, including at least transmitting one or more alerts indicative of one or more of the at least one authorized user or the at least one computing device comprises:
   circuitry for transmitting at least one alert to at least one of (a) one or more other computing devices, (b) one or more applications running on at least one cloud computing system, or (c) one or more internet available entities via at least one cloud computing system.

7. The system of claim 2, wherein circuitry for enabling one or more automatic tasks, including at least transmitting one or more alerts indicative of one or more of the at least one authorized user or the at least one computing device comprises:
circuitry for enabling performance of one or more tasks, the one or more tasks including at least the transmitting one or more alerts, at least partially based on the detecting at least one indication that the at least one computing device is not under control of the at least one authorized user.

8. The system of claim 2, wherein circuitry for enabling one or more automatic tasks, including at least transmitting one or more alerts indicative of one or more of the at least one authorized user or the at least one computing device comprises:
circuitry for enabling performance of one or more tasks at least one of previous to, concurrently with, or subsequent to the transmitting the one or more alerts.

9. The system of claim 2, wherein circuitry for enabling one or more automatic tasks, including at least transmitting one or more alerts indicative of one or more of the at least one authorized user or the at least one computing device comprises:
circuitry for transmitting the one or more alerts at least one of previous to, concurrently with, or subsequent to the controlling at least one security-related aspect of the at least one computing device.

10. The system of claim 2, wherein circuitry for controlling at least one security-related aspect of the at least one computing device at least partially based on at least one direction received from the at least one authorized user comprises:
circuitry for receiving the at least one direction from the at least one authorized user via at least one network connection.

11. The system of claim 2, wherein circuitry for controlling at least one security-related aspect of the at least one computing device at least partially based on at least one direction received from the at least one authorized user comprises:
circuitry for controlling the at least one computing device wherein the at least one computing device includes at least one locking device, the at least one locking device including one or more of a key fob, a door lock device, an entry gate, a safe, or a cage.

12. The system of claim 2, wherein circuitry for controlling at least one security-related aspect of the at least one computing device at least partially based on at least one direction received from the at least one authorized user comprises:
circuitry for facilitating at least one disabling action relating to the at least one computing device responsive to at least one user-configurable setting of the at least one computing device if the at least one computing device is not under control of the at least one authorized user, the at least one user-configurable setting provided at least one of by default or by the at least one authorized user previous to detecting the at least one indication that the at least one computing device is not under control of the at least one authorized user.

13. The system of claim 12, wherein circuitry for facilitating at least one disabling action relating to the at least one computing device responsive to at least one user-configurable setting of the at least one computing device if the at least one computing device is not under control of the at least one authorized user, the at least one user-configurable setting provided at least one of by default or by the at least one authorized user previous to detecting the at least one indication that the at least one computing device is not under control of the at least one authorized user comprises:
circuitry for facilitating at least one disabling action relating to the at least one computing device responsive to at least one number of invalid image-based login attempts, the at least one number of invalid image-based login attempts provided at least one of by default or by the at least one authorized user previous to detecting the at least one indication that the at least one computing device is not under control of the at least one authorized user.

14. A method, comprising:
maintaining at least one behavioral fingerprint, the at least one behavioral fingerprint associated with at least one computing device and at least one authorized user of the at least one computing device;
detecting, at least partially based on at least one comparative analysis, at least one indication that the at least one computing device is not under control of the at least one authorized user, the at least one comparative analysis including at least comparing at least a portion of at least one image associated with the at least one behavioral fingerprint to at least a portion of at least one image captured by at least one image sensor of the at least one computing device;
controlling at least one security-related aspect of the at least one computing device at least partially based on at least one direction received from the at least one authorized user; and
enabling one or more automatic tasks, including at least transmitting one or more alerts indicative of one or more of the at least one authorized user or the at least one computing device.

15. The system of claim 2, wherein circuitry for detecting, at least partially based on at least one comparative analysis, at least one indication that the at least one computing device is not under control of the at least one authorized user, the at least one comparative analysis including at least comparing at least a portion of at least one image associated with the at least one behavioral fingerprint to at least a portion of at least one image captured by at least one image sensor of the at least one computing device comprises:
circuitry for detecting, at least partially based on at least one facial recognition result, at least one indication that the at least one computing device is not under control of the at least one authorized user.

16. The system of claim 2, wherein circuitry for controlling at least one security-related aspect of the at least one computing device at least partially based on at least one direction received from the at least one authorized user comprises:
circuitry for facilitating at least one disabling action relating to the at least one computing device responsive to at least one direction received from the at least one authorized user to at least partially disable the at least one computing device if the at least one computing device is not under control of the at least one authorized user, the at least one direction received from the at least one authorized user previous to detecting the at least one indication that the at least one computing device is not under control of the at least one authorized user.

17. The system of claim 2, wherein circuitry for maintaining at least one behavioral fingerprint, the at least one behavioral fingerprint associated with at least one computing device and at least one authorized user of the at least one computing device comprises:
- circuitry for maintaining at least one behavioral fingerprint, the at least one behavioral fingerprint associated with (a) one or more of at least one small form factor computing device, at least one laptop, at least one netbook, at least one tablet computer, at least one slate computer, at least one e-reader, at least one mobile phone, at least one mobile device, or at least one smartphone as the at least one computing device and (b) the at least one authorized user of the at least one computing device.

18. The system of claim 2, wherein the circuitry for maintaining, the circuitry for detecting, the circuitry for controlling, and the circuitry for enabling are effected on the at least one computing device.

19. The system of claim 2, wherein the circuitry for maintaining, the circuitry for detecting, the circuitry for controlling, and the circuitry for enabling are effected on at least one other computing device distal to the at least one computing device.

20. The system of claim 2, wherein circuitry for detecting, at least partially based on at least one comparative analysis, at least one indication that the at least one computing device is not under control of the at least one authorized user, the at least one comparative analysis including at least comparing at least a portion of at least one image associated with the at least one behavioral fingerprint to at least a portion of at least one image captured by at least one image sensor of the at least one computing device comprises:
- circuitry for detecting the at least one indication that the at least one computing device is not under control of the at least one authorized user at least partially via one or more of at least one statistical algorithm, at least one statistical probability function, at least one weighting function, at least one pass image, or at least one face detection, in association with the at least one behavioral fingerprint.

21. The system of claim 1, wherein the at least one hardware computing device comprises:
- one or more of at least one personal digital assistant (PDA), at least one personal entertainment device, at least one mobile phone, at least one smartphone, at least one laptop computer, at least one tablet personal computer, at least one netbook, at least one slate computer, at least one e-reader, at least one networked computer, at least one computing system comprised of a cluster of processors, at least one computing system comprised of a cluster of servers, at least one workstation computer, or at least one desktop computer.

22. The system of claim 1, wherein the at least one hardware computing device is configured to maintain at least one behavioral fingerprint, the at least one behavioral fingerprint associated with the at least one hardware computing device and at least one authorized user of the at least one hardware computing device, detect, at least partially based on at least one comparative analysis, at least one indication that the at least one hardware computing device is not under control of the at least one authorized user, the at least one comparative analysis including at least comparing at least a portion of at least one image associated with the at least one behavioral fingerprint to at least a portion of at least one image captured by at least one image sensor of the at least one hardware computing device, control at least one security-related aspect of the at least one hardware computing device at least partially based on at least one direction received from the at least one authorized user, and enable one or more automatic tasks, including at least transmitting one or more alerts indicative of one or more of the at least one authorized user or the at least one hardware computing device from at least one memory.

23. The system of claim 2, wherein circuitry for controlling at least one security-related aspect of the at least one computing device automatically at least partially based on the detected at least one indication responsive to at least one security-related direction received from the at least one authorized user comprises:
- circuitry for controlling at least one security-related aspect of the at least one computing device automatically at least partially based on the detected at least one indication responsive to at least one security-related direction received from the at least one authorized user, the at least one security-related aspect associated with at least one of authentication, access, passwords, authorization, certificates, ownership, membership, encryption, or trust.

24. The system of claim 2, wherein circuitry for maintaining at least one behavioral fingerprint, the at least one behavioral fingerprint associated with at least one computing device and at least one authorized user of the at least one computing device comprises:
- circuitry for maintaining at least one behavioral fingerprint, the at least one behavioral fingerprint associated with at least one computing device and at least one network-accessible user.

25. The system of claim 2, wherein circuitry for maintaining at least one behavioral fingerprint, the at least one behavioral fingerprint associated with at least one computing device and at least one authorized user of the at least one computing device comprises:
- circuitry for at least one of generating or altering at least one behavioral fingerprint, the at least one behavioral fingerprint associated with at least one computing device and at least one authorized user of the at least one computing device.

26. The system of claim 2, wherein circuitry for detecting, at least partially based on at least one comparative analysis, at least one indication that the at least one computing device is not under control of the at least one authorized user, the at least one comparative analysis including at least comparing at least a portion of at least one image associated with the at least one behavioral fingerprint to at least a portion of at least one image captured by at least one image sensor of the at least one computing device comprises:
- circuitry for detecting at least one indication of at least one invalid pass image captured by the at least one image sensor associated with unlocking the at least one computing device at least partially based on the at least one behavioral fingerprint.

27. The system of claim 2, wherein circuitry for maintaining at least one behavioral fingerprint, the at least one behavioral fingerprint associated with at least one computing device and at least one authorized user of the at least one computing device comprises:
- circuitry for storing at least one image captured by at least one image sensor of the at least one computing device responsive to at least one command invoked by the at least one authorized user related to at least one security aspect.

28. The system of claim 2, wherein circuitry for detecting, at least partially based on at least one comparative analysis, at least one indication that the at least one computing device is not under control of the at least one authorized user, the at least one comparative analysis including at least comparing at least a portion of at least one image associated with the at least one behavioral fingerprint to at least a portion of at least one image captured by at least one image sensor of the at least one computing device comprises:

circuitry for detecting, at least partially via the at least one image sensor of the at least one computing device, at least one indication of at least one unrecognized face associated with unlocking the at least one computing device at least partially based on the at least one behavioral fingerprint.

29. The system of claim 2, wherein circuitry for maintaining at least one behavioral fingerprint, the at least one behavioral fingerprint associated with at least one computing device and at least one authorized user of the at least one computing device comprises:

circuitry for storing at least one image associated with a face unlock feature of a mobile device in the at least one behavioral fingerprint associated with the mobile device, including at least capturing at least one image of at least one face using at least one image sensor of the mobile device during setup of the face unlock feature of the mobile device.

30. The system of claim 2, wherein circuitry for maintaining at least one behavioral fingerprint, the at least one behavioral fingerprint associated with at least one computing device and at least one authorized user of the at least one computing device comprises:

circuitry for storing at least one image associated with a face unlock feature of a mobile device in the at least one behavioral fingerprint associated with the mobile device, including at least capturing at least one image of at least one face using at least one image sensor of the mobile device during setup of the face unlock feature of the mobile device; and circuitry for storing at least one indication of at least one audio recording associated with the face unlock feature of the mobile device in the at least one behavioral fingerprint associated with the mobile device, including at least capturing the at least one audio recording using at least one microphone of the mobile device during setup of the face unlock feature of the mobile device.

31. The system of claim 2, wherein circuitry for maintaining at least one behavioral fingerprint, the at least one behavioral fingerprint associated with at least one computing device and at least one authorized user of the at least one computing device comprises:

circuitry for storing at least two images associated with a face unlock feature of a mobile device in the at least one behavioral fingerprint associated with the mobile device, including at least capturing at least one first image of at least one face using at least one image sensor of the mobile device and capturing at least one second image of the at least one face using the at least one image sensor of the mobile device, the at least one first image or the at least one second image usable in the face unlock feature of the mobile device via the comparative analysis.

32. The system of claim 2, wherein circuitry for detecting, at least partially based on at least one comparative analysis, at least one indication that the at least one computing device is not under control of the at least one authorized user, the at least one comparative analysis including at least comparing at least a portion of at least one image associated with the at least one behavioral fingerprint to at least a portion of at least one image captured by at least one image sensor of the at least one computing device comprises:

circuitry for receiving at least one request to unlock the at least one computing device at least partially using at least one face unlock feature of the at least one computing device;

circuitry for obtaining the at least one image captured by the at least one image sensor of the at least one computing device;

circuitry for comparing at least a portion of the at least one image captured by the at least one image sensor of the at least one computing device with at least a portion of at least one image associated with the at least one behavioral fingerprint; and circuitry for unlocking the at least one computing device at least partially based on the comparing.

33. The system of claim 32, wherein the at least one computing device includes a mobile phone capable of being unlocked using a face unlock feature.

34. The system of claim 2, wherein circuitry for controlling at least one security-related aspect of the at least one computing device at least partially based on at least one direction received from the at least one authorized user comprises:

circuitry for receiving at least one indication from at least one face unlock aspect of the at least one computing device of at least one attempt to face unlock the at least one computing device by other than the at least one authorized user; and circuitry for maintaining at least one locked status of the at least one computing device at least partially based on the at least one authorized user previously configuring the face unlock feature as the at least one direction received from the at least one authorized user.

35. The system of claim 2, wherein circuitry for controlling at least one security-related aspect of the at least one computing device at least partially based on at least one direction received from the at least one authorized user comprises:

circuitry for maintaining at least one locked state of the at least one computing device responsive to at least one failed screen unlock attempt indicated by the at least one comparative analysis, the at least one direction received from the at least one authorized user including at least one screen lock setting of the at least one computing device authorized by the at least one authorized user previous to the at least one failed screen unlock attempt; and wherein circuitry for enabling one or more automatic tasks, including at least transmitting one or more alerts indicative of one or more of the at least one authorized user or the at least one computing device includes at least:

circuitry for automatically sending at least one instruction to at least one module of the at least one computing device configured for incrementing at least one failed screen unlock attempts counter responsive to the at least one failed screen unlock attempt.

36. The system of claim 2, wherein circuitry for detecting, at least partially based on at least one comparative analysis, at least one indication that the at least one computing device is not under control of the at least one authorized user, the at least one comparative analysis including at least comparing at least a portion of at least one image associated with the at least one behavioral fingerprint to at least a portion of at least one image captured by at least one image sensor of the at least one computing device comprises:

circuitry for detecting the at least one indication that the at least one computing device is not under control of the at least one authorized user, including at least one indication of other than the at least one authorized user at least one of in possession of or attempting to use the at least one computing device.

\* \* \* \* \*